(12) United States Patent
Balogun et al.

(10) Patent No.: US 9,273,544 B2
(45) Date of Patent: Mar. 1, 2016

(54) SYSTEM, METHOD, AND PROGRAM FOR MONITORING AND HIERARCHIAL DISPLAYING OF DATA RELATED TO ARTIFICIAL LIFT SYSTEMS

(75) Inventors: Oluwafemi Opeyemi Balogun, Rosenberg, TX (US); Olanrewaju Olabinjo, Sugar Land, TX (US); Fatma Burcu Seren, Houston, TX (US)

(73) Assignee: CHEVRON U.S.A. INC., San Ramon, CA (US)

(*) Notice: Subject to any disclaimer, the term of this patent is extended or adjusted under 35 U.S.C. 154(b) by 847 days.

(21) Appl. No.: 13/351,293

(22) Filed: Jan. 17, 2012

(65) Prior Publication Data
US 2013/0173165 A1 Jul. 4, 2013

Related U.S. Application Data

(60) Provisional application No. 61/581,432, filed on Dec. 29, 2011.

(51) Int. Cl.
- G06F 15/18 (2006.01)
- E21B 44/00 (2006.01)
- E21B 43/12 (2006.01)
- G06N 7/00 (2006.01)

(52) U.S. Cl.
CPC ............. *E21B 44/00* (2013.01); *E21B 43/121* (2013.01); *G06N 7/005* (2013.01)

(58) Field of Classification Search
CPC ....... G06N 3/004; G06N 3/126; G06N 5/025; G06N 5/043; G06N 7/005; G06N 99/005; G06F 11/008; G06F 17/30053; G06F 17/30625; G06F 19/14; G06F 19/20; G06F 19/24; G06F 19/28; E21B 43/121; G09B 29/00
See application file for complete search history.

(56) References Cited

U.S. PATENT DOCUMENTS

| | | | | |
|---|---|---|---|---|
| 6,048,175 A | * | 4/2000 | Corlew et al. | 417/120 |
| 6,368,068 B1 | * | 4/2002 | Corlew et al. | 417/120 |
| 6,873,267 B1 | * | 3/2005 | Tubel et al. | 340/853.3 |
| 2004/0168115 A1 | * | 8/2004 | Bauernschmidt et al. | 715/500 |
| 2007/0179742 A1 | * | 8/2007 | Tabanou et al. | 702/181 |
| 2007/0252717 A1 | * | 11/2007 | Fielder | 340/648 |
| 2012/0025997 A1 | | 2/2012 | Liu et al. | |

(Continued)

OTHER PUBLICATIONS

Plaisant et al., "Using Visualization Tools to Gain Insight Into Your Data", Oct. 8, 2003, Society of Petroleum Engineers, SPE 84439, pp. 1-9.*

Bederson et al, "Ordered and Quantum Treemaps: Making Effective Use of 2D Space to Display Hierarchies", 2002, ACM Transactions on Graphics, 21, 833-854.*

(Continued)

*Primary Examiner* — Jeffrey A Gaffin
*Assistant Examiner* — Paulinho E Smith

(57) ABSTRACT

A system, method, and computer program product are disclosed for surveillance of artificial lift systems. An Artificial Lift Surveillance Tool (ALST) is provided to identify artificial lift wells with production declines due to artificial lift well failures. Production well information is provided for a plurality of the production wells each being associated with an artificial lift system. Artificial lift system failure alerts for the plurality of production wells are received and processed on a computer. A signal indicative of the production well information for each of the plurality of production wells is received and processed on a computer. The plurality of production wells are displayed in a hierarchical ordering, such as a treemap, responsive to the signal.

21 Claims, 19 Drawing Sheets

(56) References Cited

U.S. PATENT DOCUMENTS

| | | | |
|---|---|---|---|
| 2012/0191633 A1* | 7/2012 | Liu et al. | 706/12 |
| 2013/0080117 A1* | 3/2013 | Liu et al. | 702/183 |
| 2013/0173165 A1* | 7/2013 | Balogun et al. | 702/6 |
| 2013/0173505 A1* | 7/2013 | Balogun | E21B 43/121 706/12 |
| 2014/0244552 A1* | 8/2014 | Liu et al. | 706/12 |

OTHER PUBLICATIONS

Catherine Plaisant, "The Challenge of Information Visualization Evaluation", 2004, IEEE, pp. 1-8.*

Chintalapani et al., "Extending the Utility of Treemaps with Flexible Hierarchy", Jul. 2004, International Conference on Information Visualisation, pp. 1-10.*

* cited by examiner

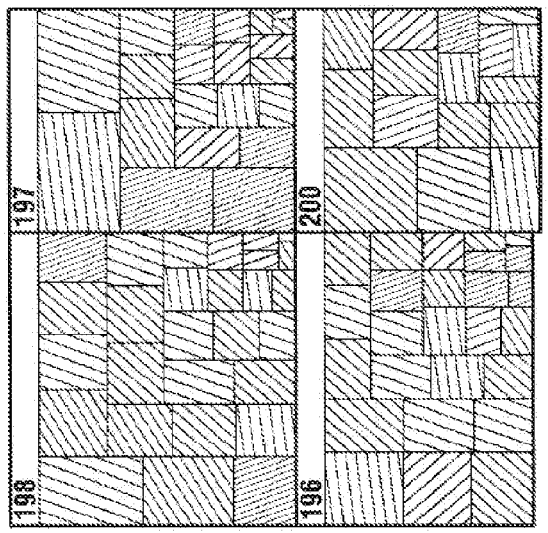

```
DESCRIPTION

WELL NAME: A                                API14: 11223344556677
ARTIFICIAL LIFT TYPE: BEAM_PUMP             FIELD NAME: B
SECTION NAME: C

OIL BBL           WATER BBL           GAS MCF
NET             207.20            33.80               0.62
DELTA           0.00              0.00                0.00
30 DAY AVG      207.20 (0.0%)     33.80 (0.0%)        0.62 (0.0%)
90 DAY AVG      187.13 (10.7%)    25.00 (35.2%)       8.83 (-92.9%)
180 DAY AVG     221.27 (-6.3%)    19.22 (75.8%)       10.35 (-94.0%)

GROSS PRODUCTION (BOEPD)   TODAY      30 DAY     90 DAY     180 DAY
                           207.30     207.30     188.60     223.00
INFERRED PRODUCTION:       187.00 BPD
FLOWLINE PRESSURE (PSI):   NO DATA AVAILABLE

LAST TESTED                DAYS SINCE            AVG DAYS BETWEEN
12/10/2010 12:00:00 AM     36                    16
OIL CUT: 85.9%             WATER CUT: 14.0%

EQUIPMENT SPECIFICATIONS
API DESCRIPTION:                          NO DATA AVAILABLE
SERIAL NUMBER (PUMP):                     NO DATA AVAILABLE
CURRENT STROKE LENGTH:                    107 IN.
STROKES PER MINUTE:                       6.22
POC TYPE/MODE:                            SAMRPC POCL
ORIGIN:                                   N/A
PUMP EFFICIENCY (SURFACE):                116.50%
FLUID LEVEL ABOVE PUMP (FT):              70.00
DATE THE EQUIPMENT DATA WAS UPDATED:      1/14/2011 7:05:05 AM
DOWN DAYS (# OF DAYS WELL IS DOWN):       NO DATA AVAILABLE
DOWNTIME REASON CODE:                     NO DATA AVAILABLE
DOWNTIME DESCRIPTION:                     NO DATA AVAILABLE
```

*FIG. 2A*

| DESCRIPTION | | | |
|---|---|---|---|
| WELL NAME: B | | API14: 22334455667788 | |
| ARTIFICIAL LIFT TYPE: ESP_PUMP | | FIELD NAME: C | |
| SECTION NAME: A | | | |

|  | OIL BBL | WATER BBL | GAS MCF |
|---|---|---|---|
| NET | 284.22 | 599.46 | 360.00 |
| DELTA | 34.25 | 148.96 | 3.67 |
| 30 DAY AVG | 249.97 (13.7%) | 450.50 (33.0%) | 356.33 (1.0%) |
| 90 DAY AVG | 224.58 (26.5%) | 392.24 (52.8%) | 349.95 (2.8%) |
| 180 DAY AVG | 219.29 (29.6%) | 416.77 (43.8%) | 355.91 (1.1%) |

| GROSS PRODUCTION (BOEPD) | TODAY | 30 DAY | 90 DAY | 180 DAY |
|---|---|---|---|---|
| | 344.22 | 309.36 | 282.91 | 278.61 |

FLOWLINE PRESSURE (PSI): NO DATA AVAILABLE

| LAST TESTED | DAYS SINCE | AVG DAYS BETWEEN |
|---|---|---|
| 01/05/2011 00:00:00 | 9 | 16 |

OIL CUT: 32.2%  WATER CUT: 67.8%

EQUIPMENT SPECIFICATIONS

|  | PHASE A | PHASE B | PHASE C |
|---|---|---|---|
| CURRENT DAILY AVG | 108.17 | 105.55 | 109.05 |
| CURRENT MONTH'S AVG | 114.61 | 111.76 | 115.67 |
| LAST MONTH'S AVG | 107.37 | 104.87 | 108.33 |
|  | AB VOLTS | BC VOLTS | CA VOLTS |
| CURRENT DAILY AVG | 440.19 | 440.19 | 440.19 |
| CURRENT MONTH'S AVG | 438.44 | 438.44 | 438.44 |
| LAST MONTH'S AVG | 445.47 | 445.47 | 445.47 |

| | |
|---|---|
| API DESCRIPTION: | NO DATA AVAILABLE |
| SERIAL NUMBER (PUMP): | NO DATA AVAILABLE |
| ORIGIN: | NO DATA AVAILABLE |
| FLUID LEVEL ABOVE PUMP (FT): | 416.00 |
| LAST CHANGES DATE AND TIME: | NO DATA AVAILABLE |
| PUMP OUTPUT FREQUENCY (HZ): | 59.00 |
| FLUID LEVEL SHOT DATE: | NO DATA AVAILABLE |
| PUMP INSTALLATION DATE: | NO DATA AVAILABLE |
| MOTOR TEMPERATURE DAILY AVG (°F): | 0.00 |
| PUMP INTAKE PRESSURE DAILY AVG (PSI): | 0.00 |
| TODAY'S RUNTIME: | 21.51 |
| YESTERDAY'S RUNTIME: | 23.93 |
| DATE THE EQUIPMENT DATA WAS UPDATED: | 1/13/2011 12:00:00 AM |
| DOWN DAYS (# OF DAYS WELL IS DOWN): | NO DATA AVAILABLE |
| DOWNTIME REASON CODE: | NO DATA AVAILABLE |
| DOWNTIME DESCRIPTION: | NO DATA AVAILABLE |

*FIG. 2B*

| ANALYZE SELECTED ALERT | SORT BY DEFAULTS | SORT BY STATUS | SORT BY SYSTEM PRIORITY | SORT BY USER PRIORITY |

OPEN ALERTS

| API14 | WELL NAME | FIELD NAME | GAUGER BEAT NUMBER | ALERT DATE | FAILURE TYPE | STATUS | SYSTEM PRIORITY | USER PRIORITY | URGENCY |
|---|---|---|---|---|---|---|---|---|---|
| 11223344556677 | AAA | A1 | 1000001 | 10/05/11 | ROD PUMP FAILURE | IN PROGRESS | LOW | MEDIUM | FAILURE DETECTED |
| 11223333446677 | BBB | A1 | 1000001 | 10/10/11 | ROD STRING FAILURE | IN EVALUATION | LOW | MEDIUM | FAILURE DETECTED |
| 11223322336677 | CCC | A2 | 1000002 | 10/10/11 | TUBING FAILURE | IN EVALUATION | LOW | NONE | FAILURE DETECTED |
| 11223311226677 | DDD | A2 | 1000003 | 10/21/11 | ROD PUMP FAILURE | NEW | LOW | NONE | FAILURE DETECTED |
| 11223300116677 | ABA | A1 | 1000001 | 09/27/11 | ROD PUMP FAILURE | NEW | LOW | NONE | FAILURE DETECTED |
| 11223289006677 | BAB | A1 | 1000001 | 09/27/11 | ROD PUMP FAILURE | NEW | LOW | NONE | FAILURE DETECTED |
| 11223277896677 | CAC | A2 | 1000002 | 09/27/11 | TUBING FAILURE | NEW | LOW | NONE | FAILURE DETECTED |
| 11223266786677 | DAD | A2 | 1000003 | 09/29/11 | ROD PUMP FAILURE | NEW | LOW | NONE | FAILURE DETECTED |
| 11223255676677 | ACA | A1 | 1000001 | 09/29/11 | ROD PUMP FAILURE | NEW | LOW | NONE | FAILURE DETECTED |
| 11223244566677 | BCB | A1 | 1000001 | 09/29/11 | ROD PUMP FAILURE | NEW | LOW | NONE | FAILURE DETECTED |
| 11223233456677 | CBC | A2 | 1000002 | 09/29/11 | ROD PUMP FAILURE | IN EVALUATION | LOW | NONE | FAILURE DETECTED |
| 11223222346677 | DBD | A2 | 1000003 | 09/27/11 | ROD PUMP FAILURE | NEW | LOW | NONE | FAILURE DETECTED |
| 11223211236677 | ADA | A1 | 1000001 | 09/27/11 | TUBING FAILURE | NEW | LOW | NONE | FAILURE DETECTED |
| 11223200126677 | BDB | A1 | 1000001 | 09/27/11 | ROD PUMP FAILURE | NEW | LOW | NONE | FAILURE DETECTED |
| 11223189016677 | CDC | A2 | 1000002 | 09/29/11 | TUBING FAILURE | NEW | LOW | NONE | FAILURE DETECTED |
| 11223177906677 | DCD | A2 | 1000003 | 09/29/11 | TUBING FAILURE | NEW | LOW | NONE | FAILURE DETECTED |

OPEN ALERTS BY FAILURE TYPE | OPEN ALERTS BY PRIORITY

ALERT PRIORITY INDICATOR

TABS

| COVER PAGE | DASHBOARD | FAILURE PREDICTIONS | WELL COMP... | WELL HIST... | NEIGHBORHOOD... | DYNO CARD... | DYNO CARD HISTORY |

WELL NAME: JJJ    303

WELL LISTING

| WELL NAME | API14 | FIELD NAME | GAUGER BEAT NUMBER | OPEN ALERTS |
|---|---|---|---|---|
| KKK | 33223344550 | B2 | 210001 | 0 |
| LLL | 33223333448 | B1 | 210001 | 0 |
| MMM | 33223332230 | *WELL LISTING VISUALIZATION* | 210002 | 1 |
| JJJ | 33223311226677 | B2 | 4210003 | 2 |
| KLK | 33223300116677 | B1 | 4210001 | 0 |
| LKL | 33223289006677 | B1 | 4210001 | 1 |
| MKM | 33223277896677 | B2 | 4210002 | 2 |
| JKJ | 33223266786677 | B2 | 4210002 | 0 |

ALERTS FOR SELECTED COMPLETION

| ALERT DATE | FAILURE TYPE | STATUS | SYSTEM PRIORITY |
|---|---|---|---|
| 10/05/11 | TUBING FAILURE | IN PROGRESS | MEDIUM |
| 10/05/11 | ROD PUMP FAILURE | IN EVALUATION | MEDIUM |

| RANK | URGENCY | | DURATION |
|---|---|---|---|
| 32 | FAILURE DETECTED | | 2 |
| 22 | FAILURE DETECTED | | 1 |

*ALERTS FOR SELECTED COMPLETIONS VISUALIZATION*    305

FILTERS

TYPE TO SEARCH FILTERS

WELL COMPLETIONS

OPEN ALERTS    0    2

ALERTS    301

STATUS
☐ CO
☑ IN
☑ IN
☑ NEW

*FILTER PANEL*

SOME FILTERS ARE HIDDEN.    SHOW ALL

SYSTEM, METHOD, AND PROGRAM FOR MONITORING AND HIERARCHIAL DISPLAYING OF DATA RELATED TO ARTIFICIAL LIFT SYSTEMS

CROSS-REFERENCE TO A RELATED APPLICATION

The present application for patent claims the benefit of United States provisional patent application bearing Ser. No. 61/581,432, filed on Dec. 29, 2011, which is incorporated by reference in its entirety.

TECHNICAL FIELD

This invention relates to artificial lift systems in oil field assets, and more particularly, to a system, method, and computer program product for surveillance of artificial lift systems.

BACKGROUND

Artificial lift systems are widely used to enhance production for reservoirs with formation pressure too low to provide enough energy to directly lift fluids to the surface. Examples of artificial lift systems include gas lift systems, hydraulic pumping units, electric submersible pumps (ESPs), progressive cavity pumps (PCPs), plunger lift systems, and sucker rod pump systems. Sucker rod pumps are currently the most commonly used artificial lift system in the industry.

There are many currently available operational tools and software programs used to monitor, evaluate, and optimize the performance of artificial lift systems. For example, pump off controllers (POCs), which gather and record periodic measurements indicative of an artificial lift system's operational status, play a significant role in monitoring the operation of artificial lift pumping systems, such as rod pumps. Additionally, POCs can be programmed to automatically shut down units if the values of torque and load deviate beyond thresholds. While POCs help reduce the amount of work required by the production and maintenance personnel operating in the field, the POCs by themselves are not sufficient. In particular, the dataset obtained by POCs poses difficult challenges due to high dimensionality, noise, and inadequate labeling.

The vast amounts of data collected (or calculated by the system) often cannot be processed in a time frame to determine what actions are needed to prevent system failures and/or improve the performance of the artificial lift well. The operating state of the artificial lift system is frequently diagnosed incorrectly, thus resulting in increased down time and reduced recovery rates. In particular, there are often interdependencies between the multiple parameters collected, which make it difficult for an automated (expert) system to evaluate the complex dynamic situations of an artificial lift system. For example, if operating parameters A, B, and C are collected where A is within normal operational conditions but B and C are outside of normal operational conditions, the system may suggest the issuance of an alert or shutdown based on the observed data signature. While there may be a need to preemptively shut down or service the artificial lift system based on the aggregate state of various operating parameters, in some cases it may be acceptable or even advantageous to continue operating the asset even if it is in a degraded mode of operation.

Expert systems, which use rule-based decisions, have been developed to better evaluate operational conditions of artificial lift systems. However, such expert systems may not perform as well as needed if a complete set of data required for making a proper diagnosis is not available. Such expert systems may also incorrectly diagnose lifting problems if the artificial lift systems are not regularly recalibrated, particularly because the parameters of operation change during the life of the well.

There is a need for automated systems, such as artificial intelligent systems that can dynamically keep track of various parameters in each and every unit, give early indications or warnings of failures, and provide suggestions on types of maintenance work required based on the knowledge acquired from previous best practices. Such a system should also display information in a useful manner such that a subject matter expert (SME) can quickly review each artificial lift system in an oil field and implement changes if necessary. Such a system would be a significant asset to the petroleum industry, especially for use in oil fields having hundreds or thousands of wells where the availability of SMEs may be limited.

SUMMARY

A method for artificial lift system surveillance is disclosed. The method comprises providing production well information for a plurality of the production wells each being associated with an artificial lift system. A signal indicative of the production well information (e.g., production well production information) for each of the plurality of production wells is received and processed on a computer. The plurality of production wells are displayed in a hierarchical ordering responsive to the signal.

A system for artificial lift system surveillance is also disclosed. The system comprises a database, a computer processor, a computer program, and a display. The database is configured to store data from a plurality of production wells each being associated with an artificial lift system. The computer program is executable on the computer processor and comprises an Artificial Lift Surveillance Tool. The Artificial Lift Surveillance Tool processes a signal indicative of production well information for each of the plurality of production wells and orders the plurality of production wells in a hierarchical ordering responsive to the signal. The display communicates with the computer program to produce image data representations of the plurality of production wells in the hierarchical ordering.

A non-transitory processor readable medium containing computer readable software instructions used for surveillance of artificial lift systems is also disclosed. The computer readable instructions comprises processing a signal indicative of production well information for a plurality of production wells each being associated with an artificial lift system and ordering the plurality of production wells in a hierarchical ordering responsive to the signal.

In one or more embodiments, the hierarchical ordering comprises a treemap that defines a plurality of cells each corresponding to one of the plurality of production wells and each of the plurality of cells have at least one cell parameter that is representative of the production well information of a corresponding production well. In one more embodiments, the at least one cell parameter comprises a cell size parameter that defines a size of each cell where the size of each cell is increased as the corresponding production well has a production gain and is decreased as the corresponding production well has a production decline. The plurality of cells can be sized to provide a proportional representation of a net fluid production for each of the plurality of production wells. In one more embodiments, the at least one cell parameter comprises a cell color parameter that indicates a variation in a fluid production rate for the corresponding production well for a time period.

In one more embodiments, the plurality of production wells being displayed in the hierarchical ordering is filtered by one or more of production well identification information, production well production information, production well test information, and a relationship between one or more of the plurality of production wells.

In one more embodiments, the plurality of production wells being displayed is updated in the hierarchical ordering based on a change in production well production information, production well test information, or a combination thereof.

In one more embodiments, one or more of the plurality of production wells being displayed are selected in the hierarchical ordering for tracking, flagging, or a combination thereof.

In one more embodiments, the hierarchical ordering groups the plurality of production wells according to production well identification information.

BRIEF DESCRIPTION OF THE DRAWINGS

FIG. 1A shows an example header of the Artificial Lift Surveillance Tool as the "group by" dropdown list is adjusted, according to an embodiment of the present invention.

FIGS. 1B-1E show various views of the data body of the Artificial Lift Surveillance Tool when different example hierarchy structures are selected, according to embodiments of the present invention.

FIGS. 2A and 2B illustrate example tooltips displayed in the Artificial Lift Surveillance Tool, according to embodiments of the present invention.

FIGS. 5A and 5B illustrate an example screenshot of the Artificial Lift Analysis Solution Dashboard, according to an embodiment of the present invention.

FIGS. 6A and 6B illustrate an example screenshot of the Artificial Lift Analysis Solution Failure Prediction Module, according to an embodiment of the present invention.

FIGS. 7A and 7B show examples of managing alerts in the Artificial Lift Analysis Solution, according to embodiments of the present invention.

DETAILED DESCRIPTION

Figure 1:
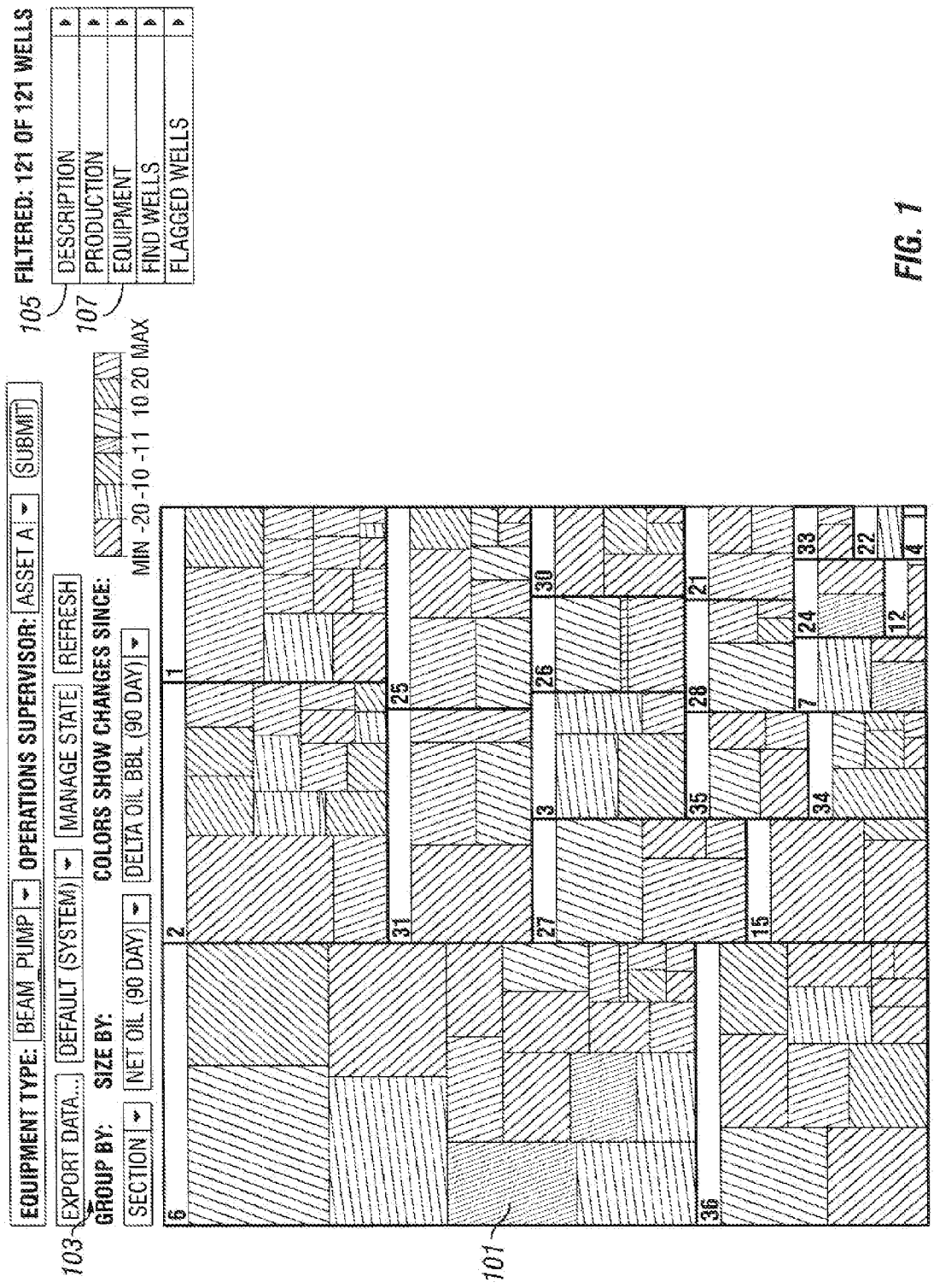
FIG. 1 illustrates an example screenshot of the Artificial Lift Surveillance Tool, according to an embodiment of the present invention.

Embodiments of the present invention relate to artificial lift system failures in oil field assets, which lead to production loss and can greatly increase operational expenditures. In particular, systems, methods, and computer program products are disclosed for surveillance, analysis, and management of artificial lift system performance. Predicting artificial lift system failures can dramatically improve performance, such as by adjusting operating parameters to forestall failures or by scheduling maintenance to reduce unplanned repairs and minimize downtime. For brevity, the below description is largely described in relation to sucker rod pumps. However, embodiments of the present invention can also be applied to other types of artificial lift systems such as gas lift systems, hydraulic pumping units, electric submersible pumps (ESPs), progressive cavity pumps (PCPs), and plunger lift systems.

In one embodiment, an Artificial Lift Surveillance Tool (ALST) is provided. In another embodiment, an Artificial Lift Analysis Solution (ALAS) is provided. In another embodiment, an Artificial Lift Management Tool (ALMT) is provided. As will be described, these tools can be used for reducing the amount of time it takes to identify an artificial lift well with a problem (i.e., identify a production exception) and attribute the problem to the artificial lift system (i.e., analyze the problem). The Artificial Lift Surveillance Tool, Artificial Lift Analysis Solution, and Artificial Lift Management Tool integrate numerous types of data and pull it into a single environment, which in turn helps to reduce analysis time. In particular, they integrate surveillance, analysis, artificial intelligence, alerts and escalations, and reporting; thereby improving the efficiency with which wells are monitored, catching exceptions early, tracking field work from beginning to end, and reducing the time and costs. This ultimately reduces downtime and lost production due to inefficiencies.

As will be described, the Artificial Lift Surveillance Tool can be used to proactively identify problems that will likely have the largest negative impact on production (e.g., identify producing wells that are experiencing large production declines). It incorporates key artificial lift metrics to help attribute production declines to common problems that occur with artificial lift systems. The Artificial Lift Surveillance Tool uses Treemap technology, which takes a large amount of data and puts it in an easy-to-review format. In particular, ALST organizes field information to focus on artificial lift systems that should further be investigated by a subject matter expert, thereby managing by exception. The Artificial Lift Analysis Solution, which typically provides a larger history of production and artificial lift system data, can be used by subject matter experts for investigating artificial lift systems. In particular, ALAS can be used to determine the root cause of problems and fully understand well performance improvement opportunities. The Artificial Lift Management Tool can be used to reduce the time needed to respond to artificial lift well failures in the field and to reduce downtime and lost production due to inefficiencies. In particular, the ALMT serves as a collaborative tool allowing operations control personnel to track well work from the time a failure alert is surfaced to the time a ticket is closed (if a ticket was opened as a result of the alert to fix the well).

FIG. 1 shows an example screenshot of the Artificial Lift Surveillance Tool. In FIG. 1, data body 101 displays individual artificial lift wells, a grouping of artificial lift wells, or both. Each individual box represents a single artificial lift well that can be grouped based on the user's preference. For example, in one embodiment, grouping can be by section, gauger beat, or manifold. Header 103 provides additional selection dropdowns that can be used to customize the view of data body 101. For example, data body 101 can be customized using header 103 based on equipment type and the operations supervisor for a given area or oil/gas field, as well as, "group by" and "size by" selection dropdowns. Customization can also be made based on recent changes in fluid production using the "colors show changes since" dropdown list. The color of each artificial lift well in data body 101 is automatically updated based on the time frame selected in the "colors show changes since" dropdown list. A legend explaining the color variances can be provided in header 103 as well. In FIG. 1, various cross-hatching patterns are used to represent different colors. However, one skilled in the art will appreciate that different colors, backgrounds, patterns, shades, textures, or other markings can be used to distinguish between different values of attributes (e.g., change in production rate).

As will be described, the description or tooltip 105 highlights detailed information for an artificial lift well selected in data body 101, including production data and equipment specifications. Filters 107 allow the user to filter out artificial lift wells according to general production metrics, as well as, metrics specific to each artificial lift method. Well identification information for each of the artificial lift wells in data body 101 is not shown in FIG. 1; however, in some embodiments, well identification information is displayed in each cell representing an artificial lift well. For example, well names are displayed in each cell of data body 101 in FIG. 4. If a cell is too small to display well identification information, in some embodiments, a pop-up window containing the well identification information is displayed when the well is selected or hovered over, such as by a computer mouse.

FIG. 1A shows an enlarged view of header 103. As will be described, header 103 can include one or more of equipment type dropdown list 109, operations supervisor dropdown list 111, "group by" dropdown list 113, "size by" dropdown list 115, "Colors show changes since" dropdown list 117, color variances legend 119, a manage state button 121, an export data button 123, a saved view dropdown list 125, and a refresh button 127. In FIG. 1A, equipment type dropdown list 109 allows the user to select the type of artificial lift system to be viewed in data body 101. For example, gas lift systems, hydraulic pumping units, electric submersible pumps (ESPs), progressive cavity pumps (PCPs), plunger lift systems, and beam/rod pump systems can be selected. In some embodiments, more than one type of artificial lift system can be selected for viewing in data body 101. In one embodiment, the equipment type dropdown is default to a particular artificial lift system, such as beam/rod pump. In another embodiment, the dropdown list is ordered alphabetically. The operations supervisor dropdown list 111 is used to switch between operations supervisor areas or oil/gas fields. Accordingly, the user can quickly navigate between different assets using the operations supervisor dropdown list 111. The "group by" dropdown list 113 allows the user to switch between various hierarchy structures. For example, in the embodiment shown in FIG. 1A, the "group by" dropdown list 113 allows the user to navigate between section, gauger beat, or manifold hierarchies. The user can also select no grouping. In each of these instances, the user can drill down to the artificial lift well level.

Figure 1C:
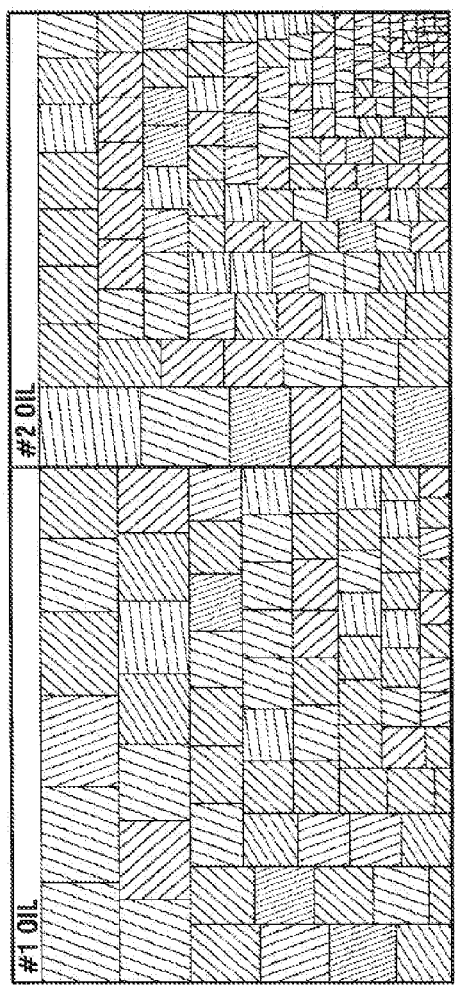
Figure 1D:
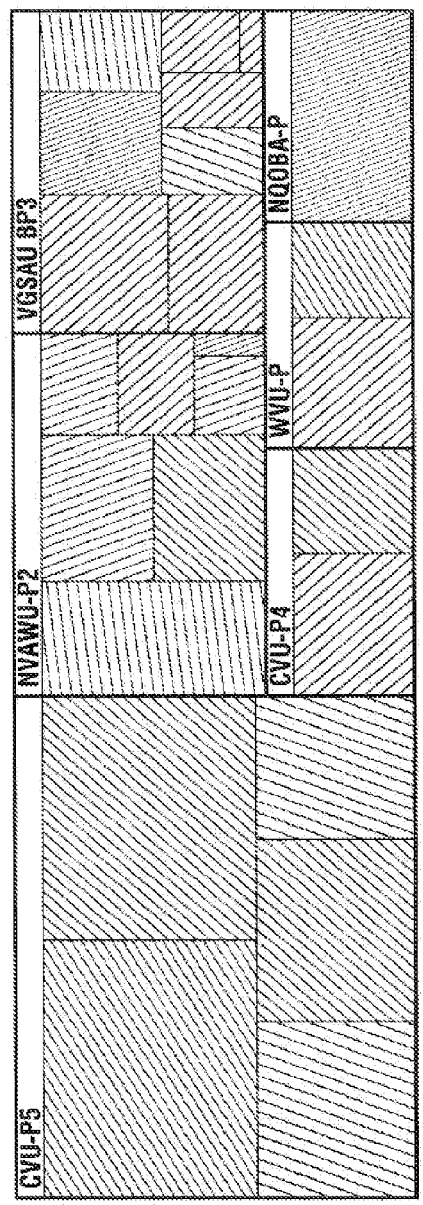
Figure 1E:
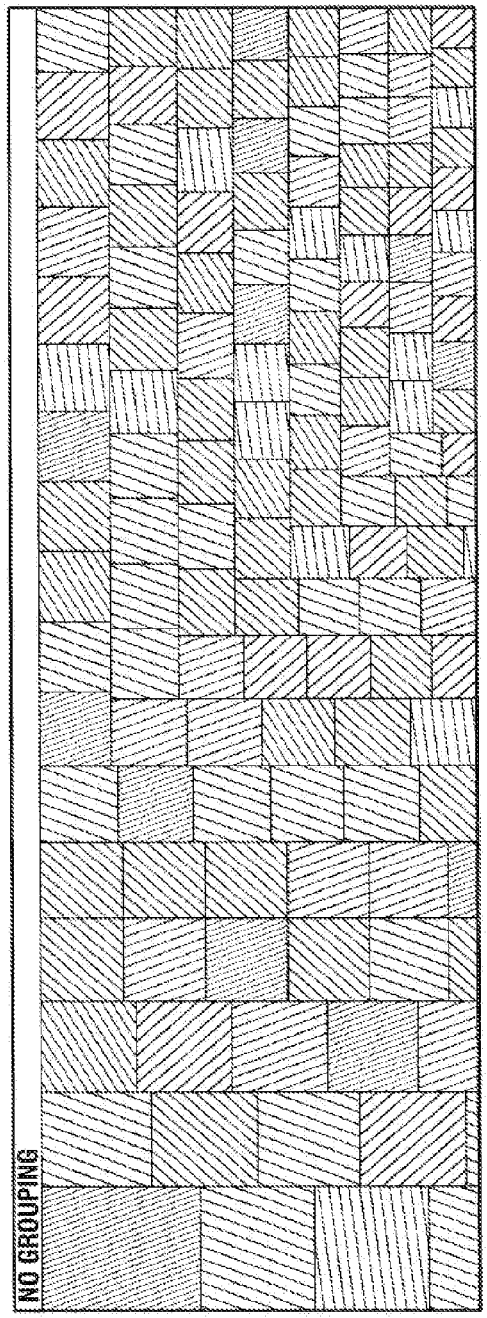

FIGS. 1B-1E show various views in data body 101 when different hierarchy structures are selected in the "group by" dropdown list 113. In particular, FIG. 1B is a display of group by section. Here, the view in data body 101 displays all artificial lift wells partitioned into four sections (i.e., sections 198, 197, 196, and 200). Although, there are four sections in this example, other fields/assets may have a smaller or larger quantity of sections. FIG. 1C is a display of group by gauger beat. Here, the view in data body 101 displays all artificial lift wells partitioned into two gauger heats (i.e., gauger heat #1 OIL and #2 OIL). Although, there are two gauger beats in this example, other fields/assets may have a smaller or larger quantity of gauger beats. FIG. 1D is a display of group by manifold. Here, the view in data body 101 displays all artificial lift wells partitioned into six manifolds (i.e., manifolds CVU-P5, NVAWU-P2, VGSAU BP3, CVU-P4, WVU-P, and NQOBA-P). Although, there are six manifolds in this example, other fields/assets may have a smaller or larger quantity of manifolds. FIG. 1E is a display showing no grouping hierarchies, as such all individual artificial lift wells in the asset are shown in this figure. In each of FIGS. 1B-1E the cross-hatched boxes, represent individual artificial lift wells in the asset. It is important to note that the number of sections, gauger beats and manifolds is dependent on the field that is being displayed in ALST. For example, field "A" might be partitioned into 4 sections while field "B" might be partitioned into 7 sections. Thus, the number of sections displayed in data body 101 when "sections" is selected in the "group by" dropdown list 113 depends on the field/asset selected in operations supervisor dropdown list 111 of header 103 (i.e., 4 sections for field "A" and 7 sections for field "B").

Figure 1F:
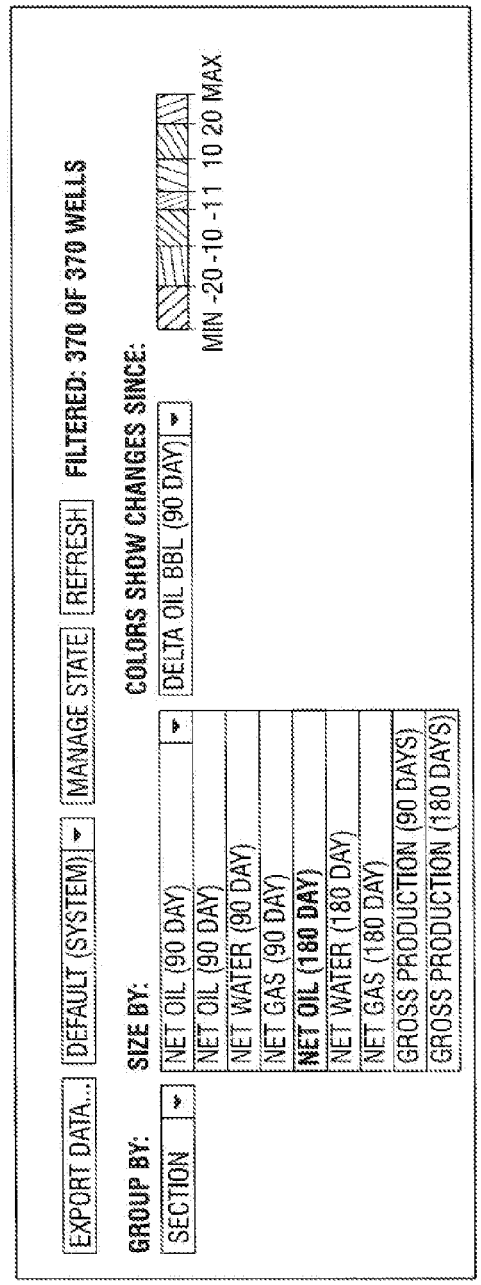
FIG. 1F shows an example header of the Artificial Lift Surveillance Tool as the "size by" dropdown list is adjusted, according to an embodiment of the present invention.
Figure 1G:
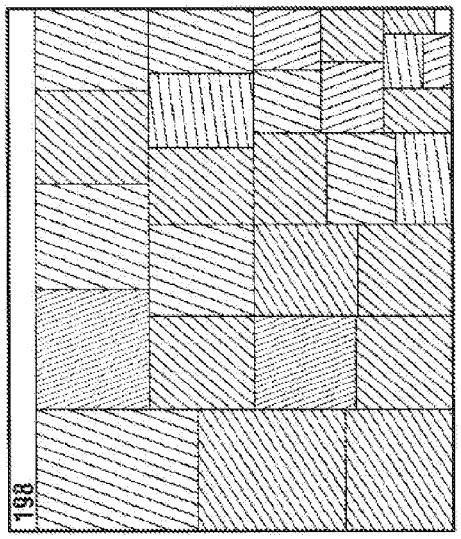
FIG. 1G shows a view of the data body of the Artificial Lift Surveillance Tool as the "size by" dropdown list is adjusted, according to an embodiment of the present invention.

FIGS. 1F and 1G show screenshots as the "size by" dropdown list 115 of header 103 is adjusted. As shown in FIG. 1F, in accordance with an embodiment of the present invention, users can adjust the size between net oil, net gas, net water, or gross production. For each of these options, the user can also select a time period for viewing, such as 90 days or 180 days. These predetermined time periods can be adjusted based on the user's preferences. As shown in FIG. 1G, artificial lift wells are grouped from largest producer (top left) to smallest producer (bottom right) in data body 101 according to the selection picked in the "size by" dropdown list 115.

Figure 1H:
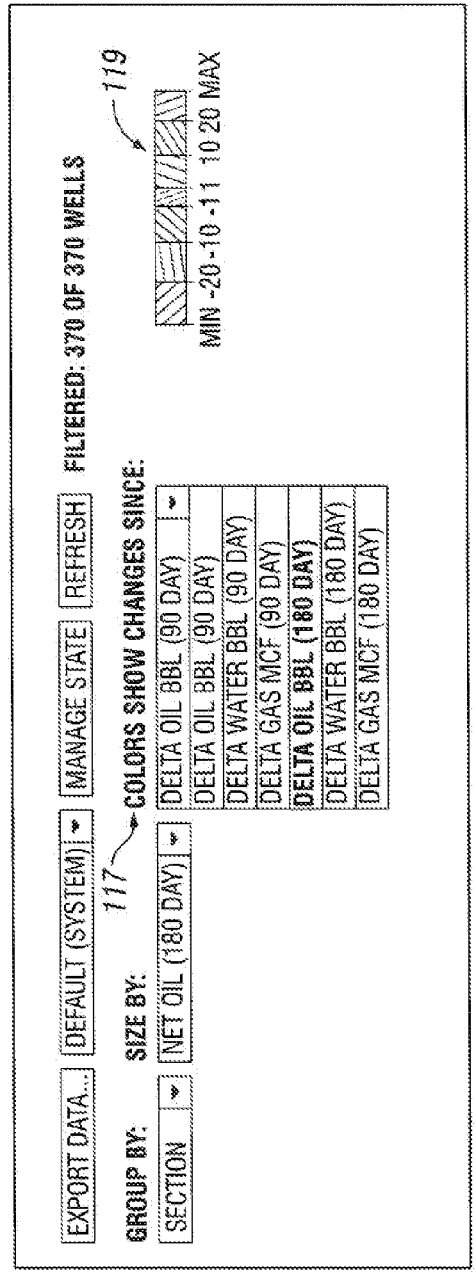
FIG. 1H shows an example header of the Artificial Lift Surveillance Tool as the "Colors show changes since" dropdown list is adjusted, according to an embodiment of the present invention.

FIG. 1H shows a screenshot as the "Colors show changes since" dropdown list 117 of header 103 is adjusted. As shown in FIG. 1H, in accordance with an embodiment of the present invention, users can display the amount of change for oil, gas, or water production. For each of these options, the user can also select a time period for viewing, such as 90 days or 180 days. These predetermined time periods can be adjusted based on the user's preferences. The color variances legend 119 illustrates the displayed range. For example, as shown in FIG. 1H, the legend shows a color range from less than about −20% difference (production loss) to more than about +20% difference (production gain). Null values (communication failures, no data, etc.) can be represented as non-colored or gray boxes. In FIG. 1H, various cross-hatching patterns are again used to represent different colors. However, as previously discussed, different colors, backgrounds, patterns, shades, textures, or other markings can be used to distinguish between different values of attributes (e.g., percent changes in production).

FIGS. 2A and 2B illustrate descriptions or tooltips 105 for example artificial lift systems. In particular, FIG. 2A shows a tooltip 105 for a rod pump system and FIG. 2B shows a tooltip 105 for an ESP. In each of these embodiments, the tooltips can be activated by hovering over or selecting a particular artificial lift well in data body 101. The tooltip 105 can provide production well information such as identification information for the artificial lift system, production information, test information, and equipment specifications. For example, identification information can include the artificial lift well name, API14 (i.e., a government assigned 14 digit unique identifier for a well by the American Petroleum Institute), artificial lift type, field location and section location. Production information can include net production or a change in production (delta production) for oil, water, gas, or a combination thereof. Average production over predetermined time periods can also be displayed. In one embodiment, the predetermined time periods are set to a 30, 90, and 180 day average of production. These predetermined time periods can be adjusted based on the user's preferences. Gross production, inferred production and flowline pressure can also be displayed. Artificial lift well test information can include oil cut, water cut, last test date, days since last test, and average days between tests.

As previously described, data body 101 can display individual artificial lift wells, a grouping of artificial lift wells, or both. By selecting an individual artificial lift well (e.g., left click of a computer mouse while hovering over the artificial lift well), a navigation menu is displayed. The navigation menu includes options such as "zoom-in" and "zoom-out" functionality. The zoom-in option, drills-down the view in the data body 101 to show a single hierarchy (e.g., section, gauger beat, manifold). In some embodiments, an artificial lift well count displays the number of wells for the selected or viewed section, gauger beat or manifold. The zoom-out option reverses the drill-down path followed by the user.

The navigation menu also can include the option for tracking one or more artificial lift wells or flagging one or more artificial lift wells through multiple views. There is no limit on the number of wells that can be tracked or flagged. Additionally, flagged wells and tracked wells can be used concurrently or independently of each other. Artificial lift wells being tracked are identified by a symbol within the artificial lift well box in the data body 101, such as a square check-box appearing within the artificial lift well box. Similarly, artificial lift wells being flagged are identified by a separate symbol within the artificial lift well box in the data body 101, such as a flag icon appearing within the artificial lift well box. A screen display of all artificial lift wells that are tracked or flagged can be displayed by the user. The tracking function is cleared each time users log out of the Artificial Lift Surveillance Tool. Accordingly, tracked wells will no longer be tagged when the tool is closed and re-opened; whereas, the flagging function is maintained when users log out of the Artificial Lift Surveillance Tool. Accordingly, flagged wells will reappear when the tool is closed and re-opened until the artificial lift well is unflagged.

Filters 107 allow users to reduce the number of wells displayed in the data body 101, by setting upper and lower limits on key production and artificial lift metrics. Typically filters 107 are used to quickly identify potential artificial lift problems. For example, the tables below list a number of filters that can be applied for rod pump systems and electrical submersible pumps:

| Production Filters | Definition |
|---|---|
| Well Test - % Oil Cut | % of oil in the produced fluid |
| Well Test - % Water Cut | % of water in the produced fluid |
| Down Wells (# of days) | Days the well has been down |
| Flowline Pressure | Pressure (psi) downstream at the wellhead |

| Equipment Filters for Rod Pump Systems | Definition |
|---|---|
| POC Run Time Delta (current vs. 7 day average) | % difference between the current run time (last 24 hours) vs. 7 day run time average |
| Delta Dyno Card Area (current vs. 7 day average) | % difference between card area of the current card vs. 7-day current card area average |
| Cycle Count | No. of starts/stops in most recent 24 hour period |
| Inferred Production vs. Metered Well Test | % difference between inferred production data and well test production data |
| Fluid Level Above Pump | Fluid above the pump in feet |
| Peak Surface Rod Load (lbs) vs. 7 day average | Current vs. 7 day average of the Peak Surface Rod Load of the full card |
| Pump Efficiency - Surface (%) | The efficiency of the pump at the surface in percentage |

| Equipment Filters for ESPs | Definition |
|---|---|
| Yesterday's Runtime | Current runtime reported from the previous day |
| Fluid Level Above Pump | Fluid above the pump in feet |
| Phase A Amps - Daily Average vs. Month's Average | % difference between the current Phase A Amps (last 24 hours) vs. 30 day Phase A Amp average |
| Phase B Amps - Daily Average vs. Month's Average | % difference between the current Phase B Amps (last 24 hours) vs. 30 day Phase B Amp average |
| Phase C Amps - Daily Average vs. Month's Average | % difference between the current Phase C Amps (last 24 hours) vs. 30 day Phase C Amp average |
| Phase A Amps - Daily Average vs. 3 Phase Average | % difference between the current Phase A Amps (last 24 hours) vs. the current 3 Phase average (Phase A, Phase B, Phase C) |
| Phase B Amps - Daily Average vs. 3 Phase Average | % difference between the current Phase B Amps (last 24 hours) vs. the current 3 Phase average (Phase A, Phase B, Phase C) |
| Phase C Amps - Daily Average vs. 3 Phase Average | % difference between the current Phase C Amps (last 24 hours) vs. the current 3 Phase average (Phase A, Phase B, Phase C) |

-continued

| Equipment Filters for ESPs | Definition |
| --- | --- |
| AB Volts - Daily Average vs. Month's Average | % difference between the current AB Volts (last 24 hours) vs. 30 day AB Volts average |
| BC Volts - Daily Average vs. Month's Average | % difference between the current BC Volts (last 24 hours) vs. 30 day BC Volts average |
| CA Volts - Daily Average vs. Month's Average | % difference between the current CA Volts (last 24 hours) vs. 30 day CA Volts average |
| AB Volts - Daily Average vs. Current 3 Leg Average | % difference between the current Phase AB Volts (last 24 hours) vs. the current 3 leg average (AB volts, BC volts, CA volts) |
| BC Volts - Daily Average vs. Current 3 Leg Average | % difference between the current Phase BC Volts (last 24 hours), vs. the current 3 leg average (AB volts, BC volts, CA volts) |
| CA Volts - Daily Average vs. Current 3 Leg Average | % difference between the current Phase CA Volts (last 24 hours) vs. the current 3 leg average (AB volts, BC volts, CA volts) |
| Pump Intake Pressure | Bottom hole pressure of the well |

Figure 3:
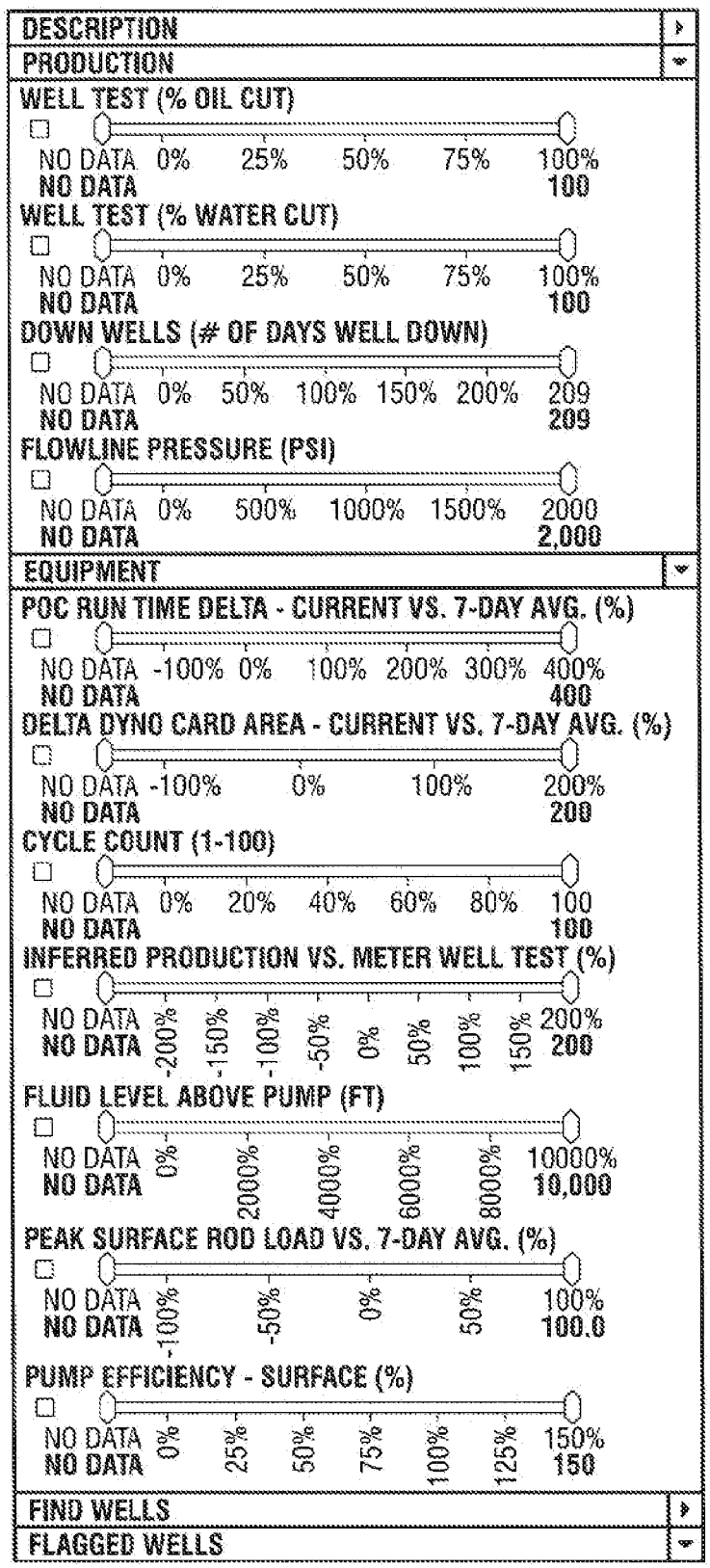
FIG. 3 illustrates example production and equipment filters for a rod pump system in the Artificial Lift Surveillance Tool, according to an embodiment of the present invention.

FIG. 3, according to an embodiment of the invention, illustrates sliding bar filters for a rod pump system that can be moved to alter the range of artificial lift wells displayed in data body 101. For example, as the bar is moved from each end, the data body set is reduced to only include artificial lift wells with values that fall within the selected range. The specific values are updated as the bars move. In one embodiment, the specific values being updated are displayed in text below the sliding bars. In one embodiment, the filters 107 remain in the selected positions in each view through zoom-ins and zoom-outs and are cleared each time users log out of tool. In this case, filters 107 default to the all open non-filtered position when the tool is re-opened.

Figure 4:
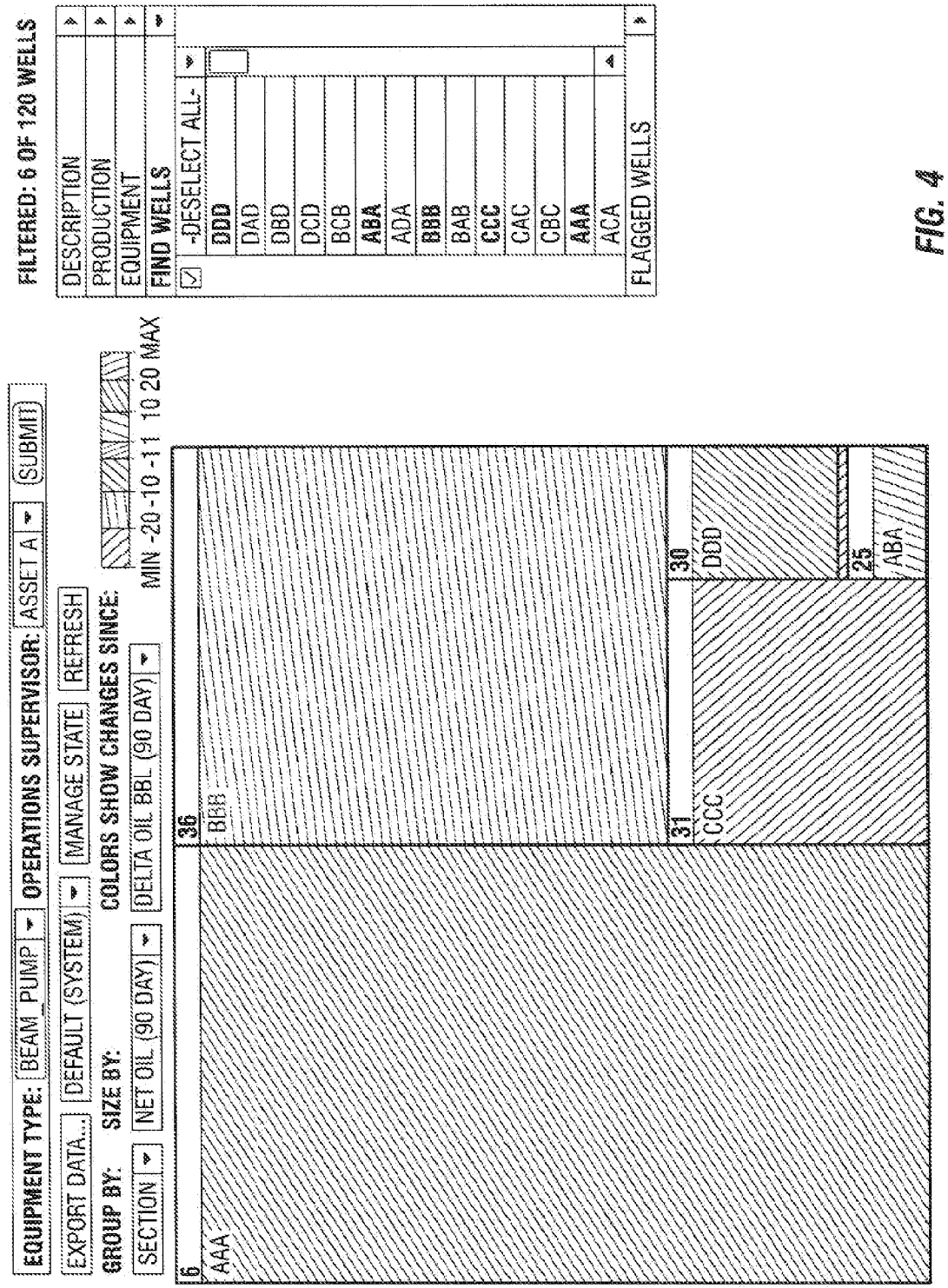
FIG. 4 illustrates an example of how artificial lift wells can be searched in the Artificial Lift Surveillance Tool, according to an embodiment of the present invention.

The navigation menu also can include the option for users to quickly search and locate a specific well or a group of wells, such as from an alphabetical listing of all artificial lift well names. FIG. 4 illustrates an example of how artificial lift wells can be selected from a listing, such as an alphabetical listing, for viewing in the data body 101. Previously searched groups of wells can also be saved in ALST. For example, the manage state button 121 (FIG. 1A) can be used to save, update, or delete a previously saved group of artificial lift wells. The saved groups of artificial wells can be accessed using the saved state dropdown list 125. Refresh button 127 can be used to return to a default system state where all artificial wells for an equipment type and asset are displayed. An export data button 123 can also be provided, such as in the header 103 to export a copy of the data being displayed in the data body 101. For example, data can be exported into a database, such as an Excel workbook, or printed to a hardcopy report for further analysis. Users have the choice whether to export all the data within the tool or only the data set currently being displayed on the screen. Users may also export all tracked or flagged cells or only those tracked or flagged cells currently being displayed on the screen.

In one embodiment, a data quality function is provided such that data falling out of normal or expected ranges is highlighted so that it can easily be investigated to resolve data integrity problems. For example, a table showing a high level summary of data quality issues can be displayed. An example table is shown below:

| Issue | Count |
| --- | --- |
| % Oil Cut Outside Threshold | 2 |
| % Water Cut Outside Threshold | 2 |
| Cycle Count Outside Threshold | 0 |

-continued

| Issue | Count |
| --- | --- |
| Delta Dyno Cart Outside Threshold | 11 |
| Flow Line Pressure Outside Threshold | 121 |
| Fluid Level Outside Threshold | 2 |
| Inferred Production vs. Meter Well Test Outside Threshold | 85 |
| POC Runtime Delta Outside Threshold | 11 |
| Pump Efficiency Outside Threshold | 12 |
| Rod Load Delta Outside Threshold | 0 |
| Values Out of Range | 121 |

In the above table, there are two artificial lift wells that have a fluid level outside the expected threshold (i.e., the values selected in the filters). A more detailed quality table can also be displayed to show data quality issues for particular artificial lift wells. For example, the following table can be displayed:

| Well Name | Field | API14 | Out of Range Values |
| --- | --- | --- | --- |
| XXX123 | A | 11223344556677 | Flow Line Pressure, Inferred Production vs. Meter Well Test |
| XXX234 | B | 11223344556688 | Flow Line Pressure |
| XXX345 | C | 11223344556688 | % Oil Cut, % Water Cut |

The navigation menu can also include the option for launching the Artificial Lift Analysis Solution (ALAS), or other artificial lift software, to further evaluate one or more selected artificial lift wells. Accordingly, production declines identified in ALST can be analyzed in ALAS. For example, such production declines can often be attributed to several different potential problems with the artificial lift system. ALAS accesses production and artificial lift system data to determine the root cause of problems and fully understand well performance improvement opportunities. In one embodiment, ALAS stores up to one (1) year of production and artificial lift system data. In another embodiment, ALAS stores up to two (2) years of production and artificial lift system data. In another embodiment, ALAS stores up to five (5) years of production and artificial lift system data.

The Artificial Lift Analysis Solution can display all artificial lift wells or a sub-set of the artificial lift wells. For example, in one embodiment, all artificial lift wells using the same artificial lift method (Equipment Type) are displayed. In one embodiment, all artificial lift wells located at the same asset (Operations Supervisor) are displayed. In one embodiment, a single well, which for example can be located by API14, Completion Name, or Well Name, is displayed. As will be described, the Artificial Lift Analysis Solution provides various modules including the dashboard module. Failure Predictions Module, well listing module, alert history module, and neighborhood well modules. In some embodiments, such as when analyzing rod pumping systems, a dyno (dynamometer) card listing module and a dyno (dynamometer) card history module can also be provided.

Figure 5B:
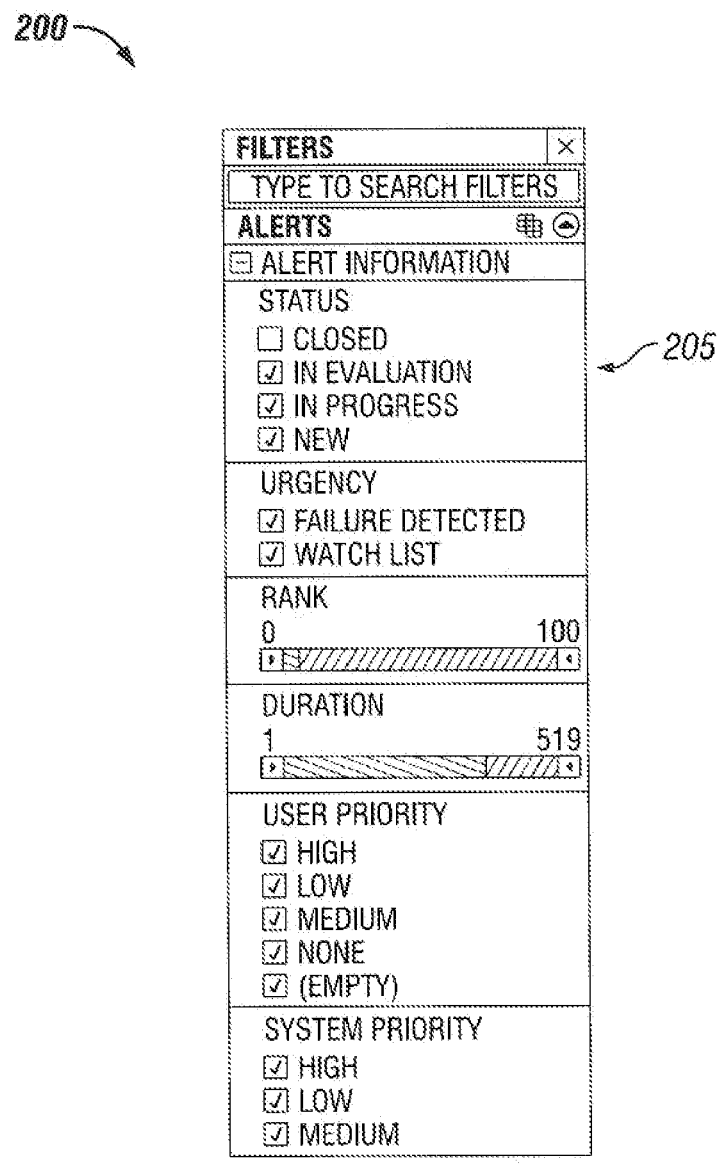

FIGS. 5A and 5B show an example of dashboard module 200. Dashboard module 200 provides users with failure alert summaries on all well completions for each failure type (e.g., rod pump failure, tubing failure, rod string failure). Data can be organized into several tables in the dashboard module. Tables typically contain a list of artificial lift wells or other artificial lift well related information. Selecting an item in a table typically populates other areas within the tool. Tables are typically sort-able by clicking on any column header within the list.

In FIG. 5A, the "Open Alerts" table 201 of the dashboard module 200 provides users with a summary of the failure alerts that have either been detected or predicted. ALAS has an Artificial Intelligence (AI) engine and alerts are sent daily based on the predictive analysis. Since alerts are not resolved immediately, daily alerts may be sent for the same issue. To eliminate "repeated" alerts, the system rolls-up the alerts into an alert summary, thus increasing the count of alerts for a given artificial lift well instead of displaying the alert for the artificial lift well multiple times. Detected failures are depicted as "failure detected" in the "urgency" column, while predicted failures are depicted as "watchlist." As used herein, the terms "detected failure" and "failure detected" are defined as forecasted artificial lift system failures eminent within 14 days, while "predicted failure" and "failure predicted" are defined as forecasted artificial lift system failures that can occur greater than 14 days way, such as between 14 days and 100 days.

Examples of methods that can be used for detecting failures are disclosed in United States provisional patent application bearing Ser. No. 61/500,325, filed on Jun. 23, 2011, which is incorporated herein by reference in its entirety. Examples of method that can be used for predicting failures are disclosed in United States non-provisional patent application bearing Ser. No. 13/118,067, filed on May 27, 2011, and United States non-provisional patent application bearing Ser. No. 13/330,895, filed on Dec. 20, 2011, both of which are incorporated herein by reference in their entirety.

In one embodiment of the present invention, the "Open Alerts" table 201 is displayed based on a default sorting. For example, alerts can be defaulted to be sorted first according to urgency, then by rank, and then by status. With regards to urgency, the highest level of urgency is "failure detected." The lower and next level of urgency is the "watchlist." Rank is used to sort by normalizing the average daily production and potential production volume loss. Ranking can be based on a scale (e.g, a 100 point scale) where a higher rank correlates to a higher producer with higher potential volume loss. An artificial lift well's priority can change daily based on the productivity loss for the artificial lift wells that have open alerts each day. The status column can be sorted according to "new" alerts, "in evaluation" alerts, "in progress" alerts, and "closed" alerts. All alerts are included in the daily ranking until they have a status of closed. In some embodiments, a system priority can be assigned to open alerts (i.e., new, in evaluation, or in progress). For example, a "high" priority can be assigned to the top 40% of the alerts, a "medium" priority can be assigned to the middle 40% of the alerts, and a "low" priority can be assigned to the bottom 20% of the alerts. The artificial lift wells can further be color-coded based on the system priority when the alerts are displayed to the user. For example, artificial lift wells having a high priority can be colored red, artificial lift wells having a medium priority can be colored orange, and artificial lift wells having a low priority can be colored yellow. Furthermore, normal wells having no predicted or detected failures can be colored green. As previously discussed, different backgrounds, patterns, shades, textures, or other markings can alternatively be used. The user can also sort data (i.e., information sorted under column headers) in ascending or descending order based on any column of interest.

In one embodiment, the Artificial Lift Analysis Solution (ALAS) has buttons 203 at the top of the screen on the dashboard module 200. For example, buttons 203 can include an "Analyze Selected Alert" button, a "Sort by Defaults" button, a "Sort by Status" button, a "Sort by System Priority" button, and a "Sort by User Priority" button. The "Analyze Selected Alert" button takes the user to the Failure Predictions Module and displays artificial lift wells for further evaluation that were selected by a user in the dashboard module 200. As will be described, it provides the artificial lift well's open alerts, history trend and alert history. In addition, the artificial lift well associated with the selected alert is also placed in other ALAS modules for further analysis. The "Sort by Defaults" button, resets the sort order back to the system defaults. For example, the "Sort by Defaults" button can be based on immediacy of failure (urgency) and potential production volume loss (rank). The "Sort by Status" button sorts open alerts in the order of "new" alerts (alerts not previously reported), "in evaluation" alerts (confirmation and evaluation of the alert is being performed), "in progress" alerts (appropriate personnel have been notified of the alert or remediation is in progress), and "closed" alerts (work has been completed or the alert has been identified as a false positive and returned for retraining). Alternately, clicking on the "Status" column header will sort open alerts alphabetically (i.e., closed, in evaluation, in progress and new). In one embodiment, the "Sort by System Priority" button sorts open alerts in the order of high, medium and low priority. In another embodiment, clicking on the "Sort by System Priority" column header will sort open alerts alphabetically (i.e., high, low and medium). The "Sort by User Priority" button sorts open alerts in an order established by the user. Clicking any of the buttons 203 a second time can reverse the order items are sorted in.

FIG. 5B shows the Open Alerts Filter Panel 205, which allows the user to better manage the "Open Alerts" table 201. The initial display is based on default filter settings. The user may at any time change the settings of one or more filter(s). The selected view will remain until the user changes the filters or closes the application. When the application is reopened, the filters will return to the default settings. In one embodiment "slider" filters are used to manage the "Open Alerts" table 201. Slider filters allow the user to quickly indicate a range of values for one or more attributes. For example, slider filters are used for rank and duration in FIG. 5B. Here, the minimum (0 for rank, 1 for duration) and maximum (100 for rank, 519 for duration) are automatically populated based on the dataset provided. In another embodiment, "checkbox" filters are used to manage the "Open Alerts" table 201. Checkbox filters allow the user to select or deselect one or more values of each attribute. For example, checkbox filters are used in FIG. 5B for status, urgency, user priority, and system priority.

Visualization window 207 (FIG. 5A) is provided to display changes in the "Open Alerts" table 201. For example, visualization window 207 can include a pie chart of open alerts by failure type (e.g., rod pump failures, tubing failures). In some embodiments, a percent ratio and count of each failure type can also be displayed in visualization window 207. Visualization window 207 can also include a pie chart of other column information. For example, FIG. 5A shows a pie chart of open alerts by system priority (i.e. high, low and medium). Data can alternatively be displayed in visualization window 207 using other common graphics such as bar or line graphs.

In "Open Alerts" table 201, the user has the ability to select any of the alerts displayed. Here, the user can click on the "Analyze Selected Alert" button 203 to further analyze any of the alerts. The "Analyze Selected Alert" button takes users to the Failure Predictions Module where historical data trends can be viewed and further analysis can be performed. As previously discussed, the Failure Predictions Module can also be accessed directly by clicking on the Failure Predictions tab in ALAS.

Figure 6B:
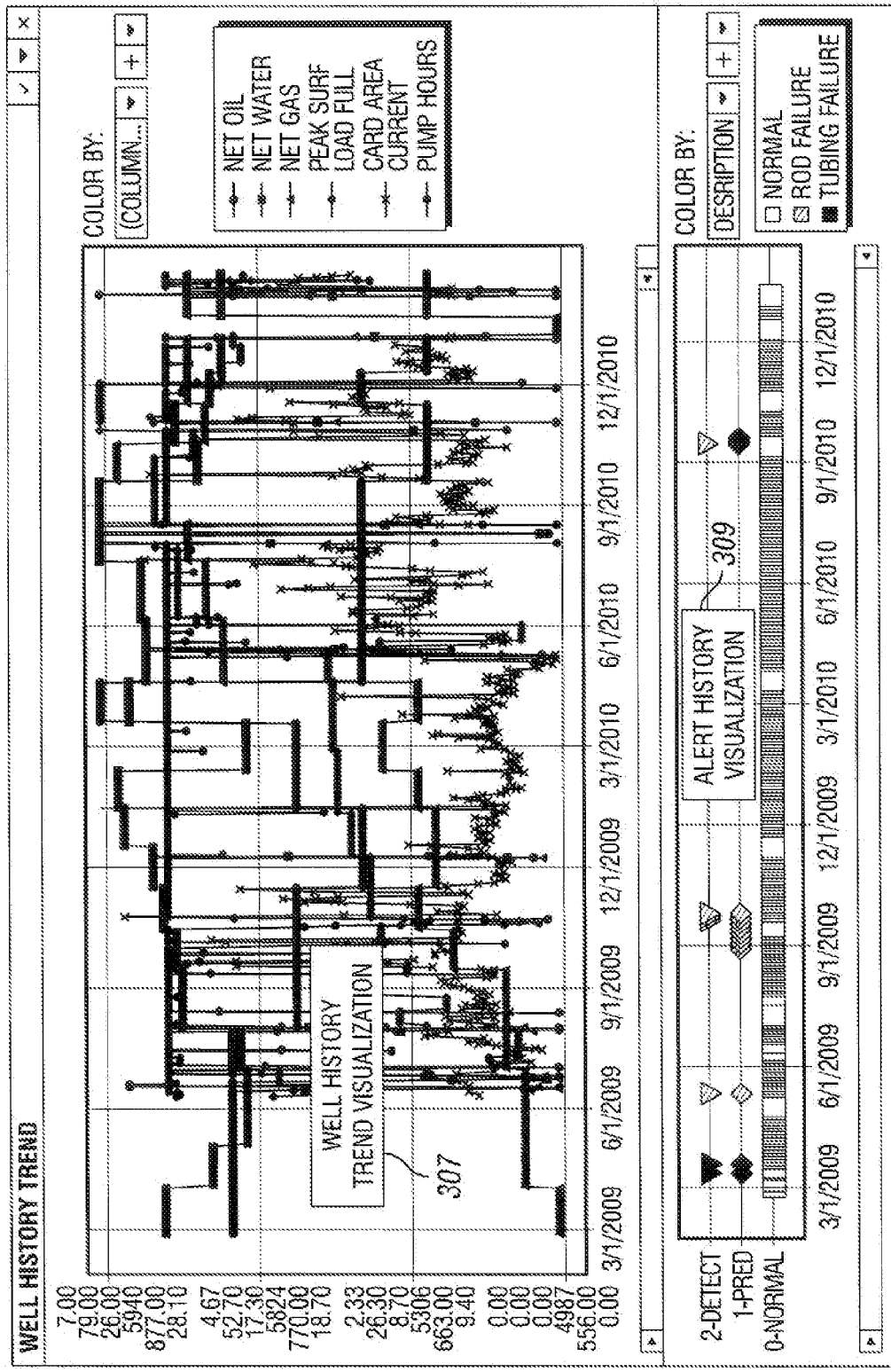

FIGS. 6A and 6B show an example of Failure Predictions Module 300. As will be described, Failure Predictions Module 300 can be used to view a breakdown of alert summaries, view history trend graphs for identified wells and view alert history graphs that depict detection and prediction alert occurrences for selected wells by alert type. In FIG. 6A, the name of the artificial lift well and an associated alert priority indicator, which represents the highest priority alert for the selected well such as by color or shading, are displayed at the top of the page. In one embodiment, Failure Predictions Module 300 includes four visualizations and a filter panel 301. The visualizations are well listing 303 (FIG. 6A), alerts for selected completions 305 (FIG. 6A), well history trend 307 (FIG. 6B), and alert history 309 (FIG. 6B).

Filter Panel 301, which is similar to filters 205 of dashboard 200, allows the user to manage the open alerts appearing in the visualizations of Failure Predictions Module 300. The initial display is based on default filter settings; however, the user may at any time change the settings of one or more filter(s). The selected view will remain until the user changes the filters or closes the application. When the application is reopened, the filters will return to the default settings.

The visualization for well listing 303 displays information on all artificial lift wells whether or not they have alerts. The user may select any listed artificial lift well on this table for further analysis. When the well selection is changed, the newly selected artificial lift well is highlighted. The information displayed throughout the Failure Predictions Module 300 automatically updates to reflect the selected artificial lift well(s). For example, if an alerting well is selected, the alerts for the selected well will be populated and displayed in the visualization for alerts for selected completions 305. If the well chosen has no alerts, no alerts will be populated in the visualization for alerts for selected completions 305. If a well is not tagged as having an alert but the user knows of an alert, an alert can be created and saved for that well.

The visualization for alerts for selected completions 305 contains a list of the alerts for wells selected in well listing 303. Alerts for selected completions 305 include a duration attribute, which depicts the number of days since the first alert for that specific failure was surfaced by the artificial intelligence engine. The duration attribute continues to count the number of days until the alert is closed. The alerts displayed can be ordered based on failure type, status, system priority, or user priority.

Alerts can be managed by selecting an alert in either the visualizations for well listing 303 or the alerts for selected completions 305. For example, to manage an alert the user can select the desired completion, such as by performing a right click with a mouse, to bring up a pop-up menu. "Manage Alert" can be selected in this menu, which brings up a dialog box where the user will be able to change the status, enter the alert close date, add comments, return the alert for retraining, and/or send an editable email containing a link for the selected alert. The user will also be able to "create an alert" if a failure occurs that was not detected or predicted by the artificial intelligence engine. At any time a failure is identified in the field that should have been detected or predicted, the user is able to use the manage alert pop-up to create an alert and have it returned to, the artificial intelligence engine for retraining. The ability to manage alerts can be restricted to subject matter experts or power users of ALAS if desired.

Figures 7A, 7B:
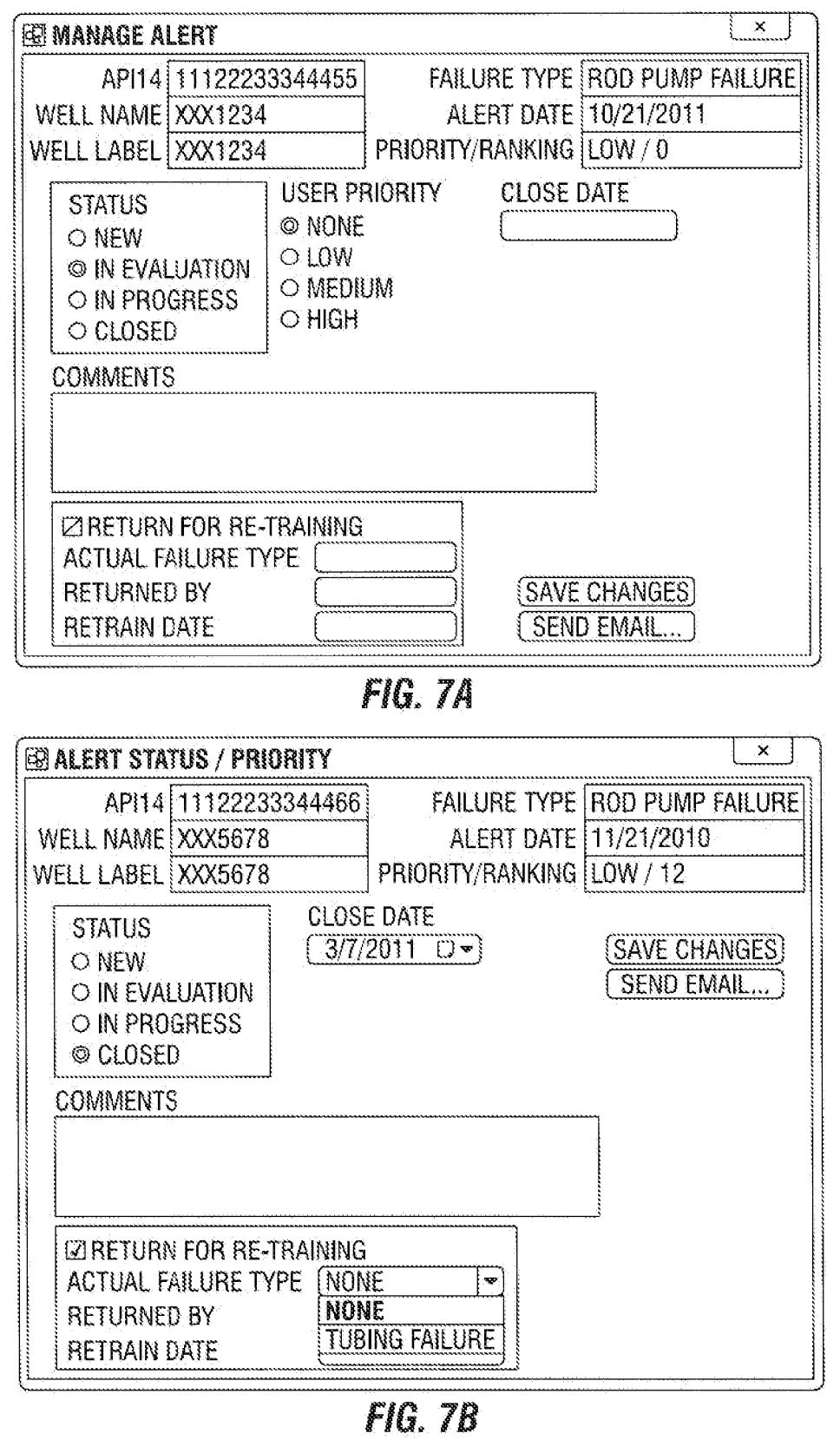

FIGS. 7A and 7B show examples of manage alert pop-ups. A new alert can be either a good alert, a false alert, or it can reflect an actual alert but the wrong failure type. When an alert is a false alert, the user can check the "Return for retraining" box and identify the actual failure type as none. If the status is set to "In Evaluation," as in FIG. 7A, the system will continue to track similar alerts under the same alert summary. If the status is set to "Closed," as in FIG. 7B, the system will generate a new alert summary for next alert received. When an alert indicates the wrong failure type, the user can check the "Return for retraining" box, select the correct failure type, update the "Status" of the artificial lift well, and add comments as appropriate to keep the alert flowing through the alert process.

The visualization for well history trend 307 (FIG. 6B) is a graph displaying trend data for a selected well. In one embodiment, the graph includes 1 year of artificial lift data. In another embodiment, the graph includes 2 years of artificial lift data. Viewing the data in this format can help to quickly identify changes in key artificial lift metrics. The trend data also helps to tie several metrics together. For example, if water production was increasing while oil production was decreasing and rod load was increasing, a problem with the pump is probable. The user may add and/or remove trending parameters from a dropdown menu that is inherent to the visualization section. Moreover, the dropdown menu can be defaulted to list trending parameters for the selected well. For example, for rod pump wells the trend graph can default to net oil, net gas, net water, peak surface load full, and card area current. For ESP Wells, the trend graph can default to net oil, net gas, net water, yesterday's runtime, daily motor temperature, pump output frequency, and pump intake pressure. The changes to the data being trended are displayed during the user's current session and typically return to the default data when the user's session is closed.

The visualization for alert history 309, which is shown in FIG. 6B, is a graph of the each alert that has been surfaced by the artificial intelligence engine. For example, the graph can show each type of alert, the day it was surfaced, and the failure type for the selected well. The data used to populate well history trend 307 and alert history 309 can be retrieved from one or more databases or information storage system such as a System of Records (SOR), DataMart™, LOWIS™ (Life of Well Information Software), or Microsoft® Access. The graphs for both the well history trend 307 and alert history 309 display time on the x-axis. The period investigated can be changed by the user to alter the display as desired. In one embodiment, the two graphs are synchronized such that an adjustment to time on one graph is reflected in the other graph. Additional information about a data point can be displayed by hovering over the data point. For example, this information can include identifying information for a selected well, including Operations Supervisor, Gauger Beat. Name, Field Name, API14, Lift Type, Producing Method and Down Days.

Each data point on the well history trend 307 and alert history 309 is associated with a point in history for the well. Typically well test data associated with that data point can be displayed. Production information, which is calculated between well tests taking into account any downtime during the period, can also be displayed. Production information can include the current oil, water and gas production, along with the average production for a period of time, such as over 30 days, 60 days, 90 days, or 6 months. This well test data and production information can be used to analyze the presence of any issues. For example, a decline in production for the well could be observed indicating that a change may need to be made to the artificial lift system. Historical equipment changes can also be tracked, which can be used to tie a performance problem to a recent equipment change (or lack thereof). For example, the timing of a recent job can be compared to a decrease in production to eliminate the possibility of a pump setting change as the cause of the production decline.

Figure 8A:
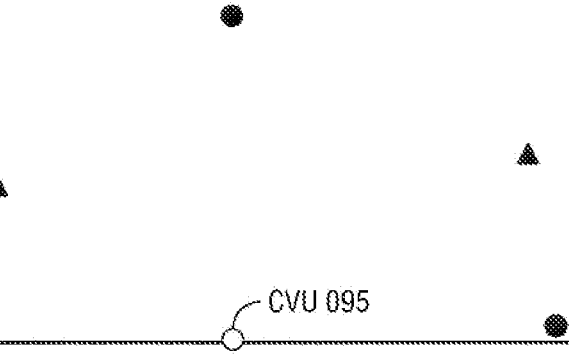
FIGS. 8A and 8B illustrate an example screenshot of the Artificial Lift Analysis Solution Neighborhood Wells Module, according to an embodiment of the present invention.
Figure 8B:
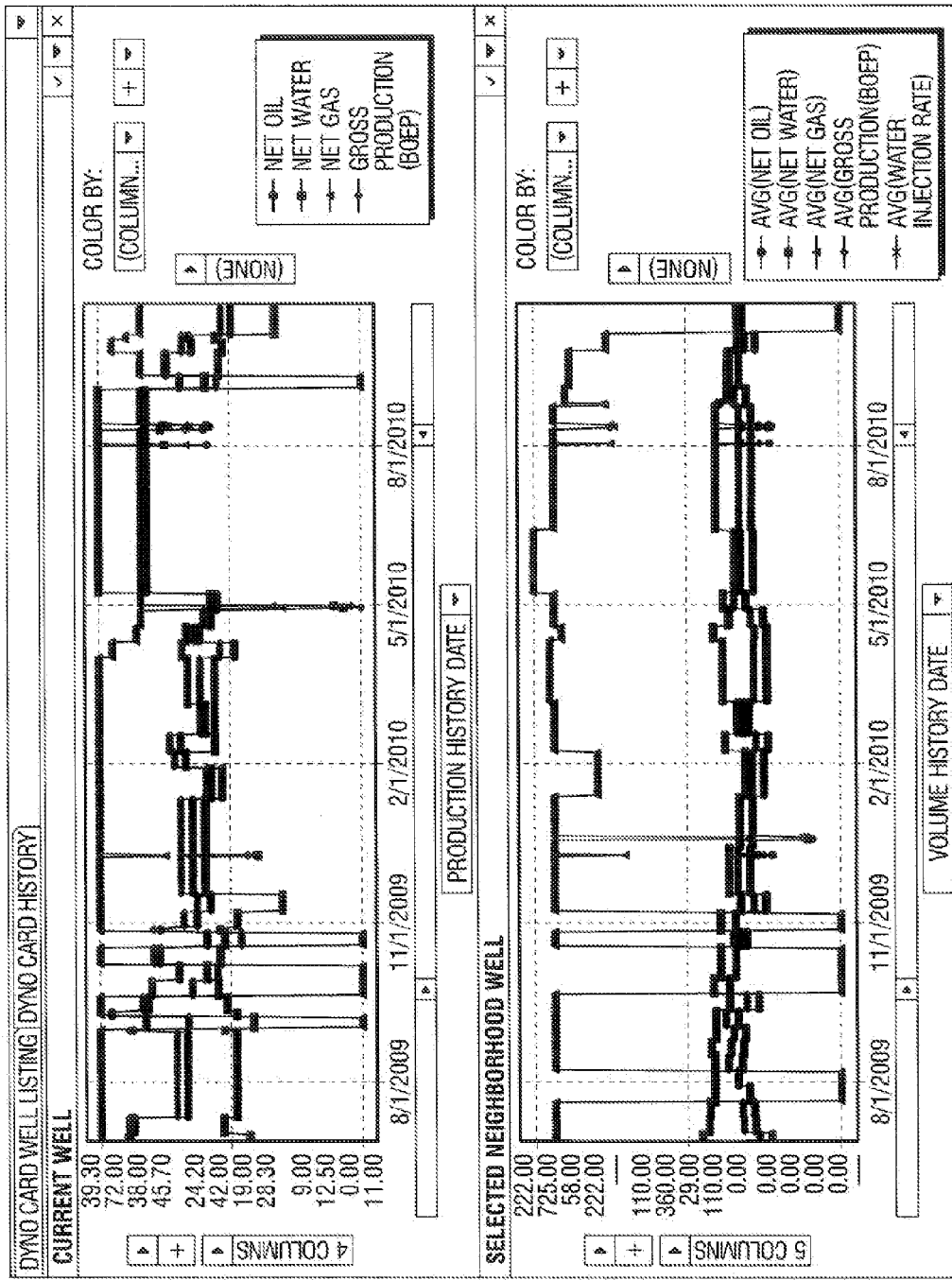

According to one embodiment, information associated with surrounding artificial lift wells of a selected artificial lift well can be reviewed by selecting the "Neighborhood Wells" module in ALAS. In particular, the Neighborhood Wells module provides detailed data, including production summary data and production trends, for producer and injector wells within the same region (e.g., a certain radial distance) of a selected well. This information can be used to identify any potential production interference between wells within the same region. Accordingly, the selected well data can be visually compared to neighboring well data to evaluate commonalities/anomalies and thus determine whether issues are isolated to an individual well or if they are more wide spread. For example, well data can be compared by Operations Supervisor, Gauger Beat, Field Name, Equipment Type, Lift Type, Producing Method and Down Days. An example screenshot of the Neighborhood Wells module is shown in FIGS. 8A and 8B.

In one embodiment, a dyno card well listing module is provided in ALAS. The dyno card well listing module displays the results of Artificial Intelligence, such as an Artificial Neural Network (ANN), and rule-based (based on subject matter expert knowledge) analysis, which identifies cards that may be having several common pump problems. For example, the dyno card well listing can display well names, basic equipment, production data and any issues that the tool predicted in the cards such as pump fillage, friction or POC problems. The results from the dyno card well listing module can be utilized to quickly identify cards that require further investigation. The following table shows examples of dyno cards that can be utilized to analyze pump issues:

| Card Type | When is this card used? | Results |
| --- | --- | --- |
| Current Card | Available when well is not cycling. | POC Problem Fillage Tubing Movement Leak |
| Full Card | Available when well is cycling. | POC Problem Fillage Tubing Movement Leak |

-continued

| Card Type | When is this card used? | Results |
| --- | --- | --- |
| Pump Off Card | Available when well is cycling. Typically used to predict issues with Pump Off Fillage and Friction or when current and full cards are not available. | POC Problem Fillage Tubing Movement Leak PO Fillage Friction |

Figure 9:
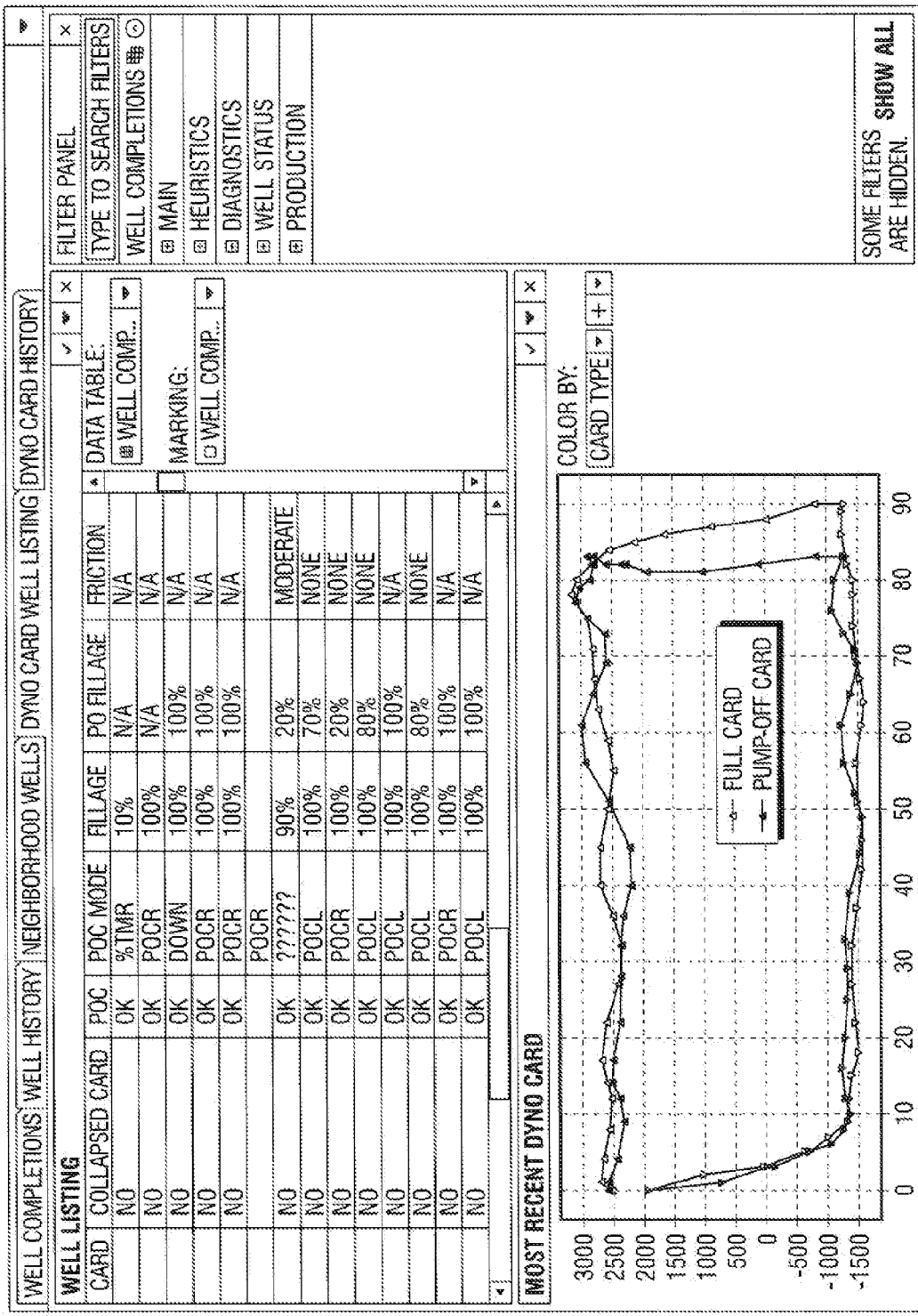
FIG. 9 illustrates an example screenshot of the Artificial Lift Analysis Solution Dyno Card Well Listing Module, according to an embodiment of the present invention.

FIG. 9 shows an example of a dyno card well listing provided in ALAS. The following logic can be used to populate the dyno card well listing:

Does the card appear to be collapsed?
  If true, "Yes" is indicated in the "Collapsed Card" column
Does the card indicate that there is an outflow issue?
  If true, "Yes" is indicated in the "Outflow" column. Outflow issues can be assessed using a formula that looks at fillage for variable speed drive (VSD) pumps and fluid level for non-VSD pumps.
Is there a pump-off controller (POC) issue?
  If true, "Problem" is indicated in the "POC" column. Here, no pump issues can be analyzed because the data is not reliable and "N/A" will appear for other columns.
is there a fillage issue?
  The tool will indicate the card's percent fillage in the "Fillage" column. Fillage is typically assessed only when there is a valid card.
Is there friction?
  If true, "Yes" is indicated in the "friction" column. In one embodiment, friction is assessed only when there is a valid pump off card that is less than 90% full.
Is there tubing anchor movement?
  If true, "Yes" is indicated in the "tubing anchor movement" column. In one embodiment, tubing anchor movement is assessed only when there is a valid card that is more than 90% full.
Is there a leak?
  Leaks are typically assessed only when there is a valid card.

The dyno card well listing can also be filtered based on basic well data (e.g., API14, well name, field name, section, gauger beat, gauger beat number, prediction conflict, card date, card type, POC mode, inverted card and VSD), heuristics data coming directly from the well (e.g., collapsed card and outflow), diagnostics of most common pump problems (e.g., POC problems, fillage issues, friction, tubing movement, leak), well status including the number of days a well has been down and down code (e.g., DH (hole in tubing), DO (other downhole problems), DP (pump failure), LE (electrical equipment problem), LO (other surface problem), LW (pumping unit problem), OL (pipeline/flow line leak), OS (stimulation, e.g., hydraulic fracture)), production data (e.g., gross production, net oil, production date, runtime), or a combination thereof. Use of these filters help narrow down the wells such that only wells that may have a given issue are displayed.

Figure 10:
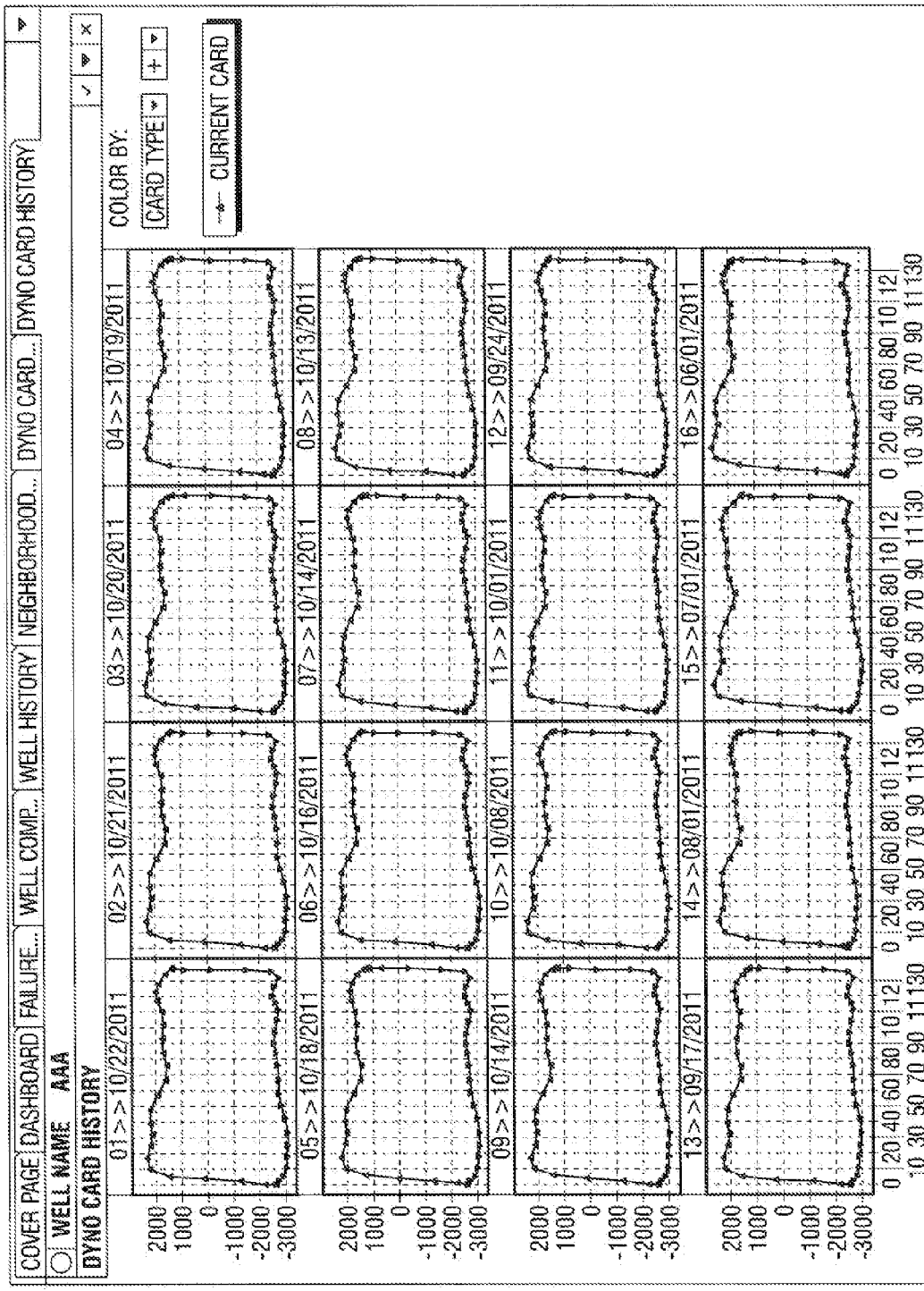
FIG. 10 illustrates an example screenshot of the Artificial Lift Analysis Solution Dyno Card History Module, according to an embodiment of the present invention.

In one embodiment, a dyno card history module is provided in ALAS. The dyno card history module displays historical dyno cards for the selected well. For example, in one embodiment, 16 historical dyno cards are displayed. Here, the first 8 cards represent the most current eight daily readings. The next 4 cards display readings at approximate weekly intervals taking the first available card for each week over a four week period. The last 4 cards display monthly (4 week)

intervals taking the first available card from the first week of each four week period. This historical data can help to quickly identify key changes in the dyno cards and pinpoint when an issue may have begun. FIG. 10 shows an example of a dyno card history for an artificial lift well.

All information in ALAS can be exported. For example, data can be exported into a database, such as an Excel workbook, or printed to a hardcopy report for further analysis. Information can also be exported to PowerPoint for use in a future presentation. Alerts can further be passed to the Artificial Lift Management Tool (ALMT).

In one embodiment, an Artificial Lift Management Tool (ALMT) is used to reduce the time needed to respond to artificial lift well failures in the field, thereby reducing downtime and lost production due to inefficiencies. The Artificial Lift Management Tool serves as a collaborative tool allowing operations control personnel in the field to track artificial lift well work from the time a failure alert is surfaced and a ticket is opened to the time the ticket is closed. Automatic alerts for exceptions are circulated to designated field personnel using artificial intelligence. Such alerts include specific instructions with regards to handling the alert. If alerts are not reviewed and/or closed by the designated field personnel within a predetermined time period (e.g., 1 day, 1 week), the alerts can be rerouted to an alternate contact, such as the field personnel's supervisor. ALMT can also prioritize alerts to be handled, such as by each artificial lift well's production volumes and/or percentage production loss. Accordingly, field personnel can follow the process from exception identification until the alert has been closed. The Artificial Lift Management Tool enables different levels of users to access information on the completion level (% of actions completed, personnel assigned, days since alert, etc.) of defined tasks, which can improve the rigor around management and closure of action items. Resolutions to alerts are tracked and tied back to a knowledge base, which can later be used for recommending solutions for future alerts. Tracking can further be used to report performance with regards to handling alerts to field management teams.

Those skilled in the art will appreciate that the above described methods may be practiced using any one or a combination of computer processing system configurations, including, but not limited to, single and multi-processor systems, hand-held devices, programmable consumer electronics, mini-computers, or mainframe computers. The above described methods may also be practiced in distributed or parallel computing environments where tasks are performed by servers or other processing devices that are linked through one or more data communications networks. For example, large computational problems can be broken down into smaller ones such that they can be solved concurrently—or in parallel. In particular, the system can include a cluster of several stand-alone computers. Each stand-alone computer can comprise a single core or multiple core microprocessors that are networked through a hub and switch to a controller computer and network server. An optimal number of individual processors can then be selected for a given problem.

As will be described, the invention can be implemented in numerous ways, including for example as a method (including a computer-implemented method), a system (including a computer processing system), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore, are not to be considered limiting of its scope and breadth.

Figure 11:
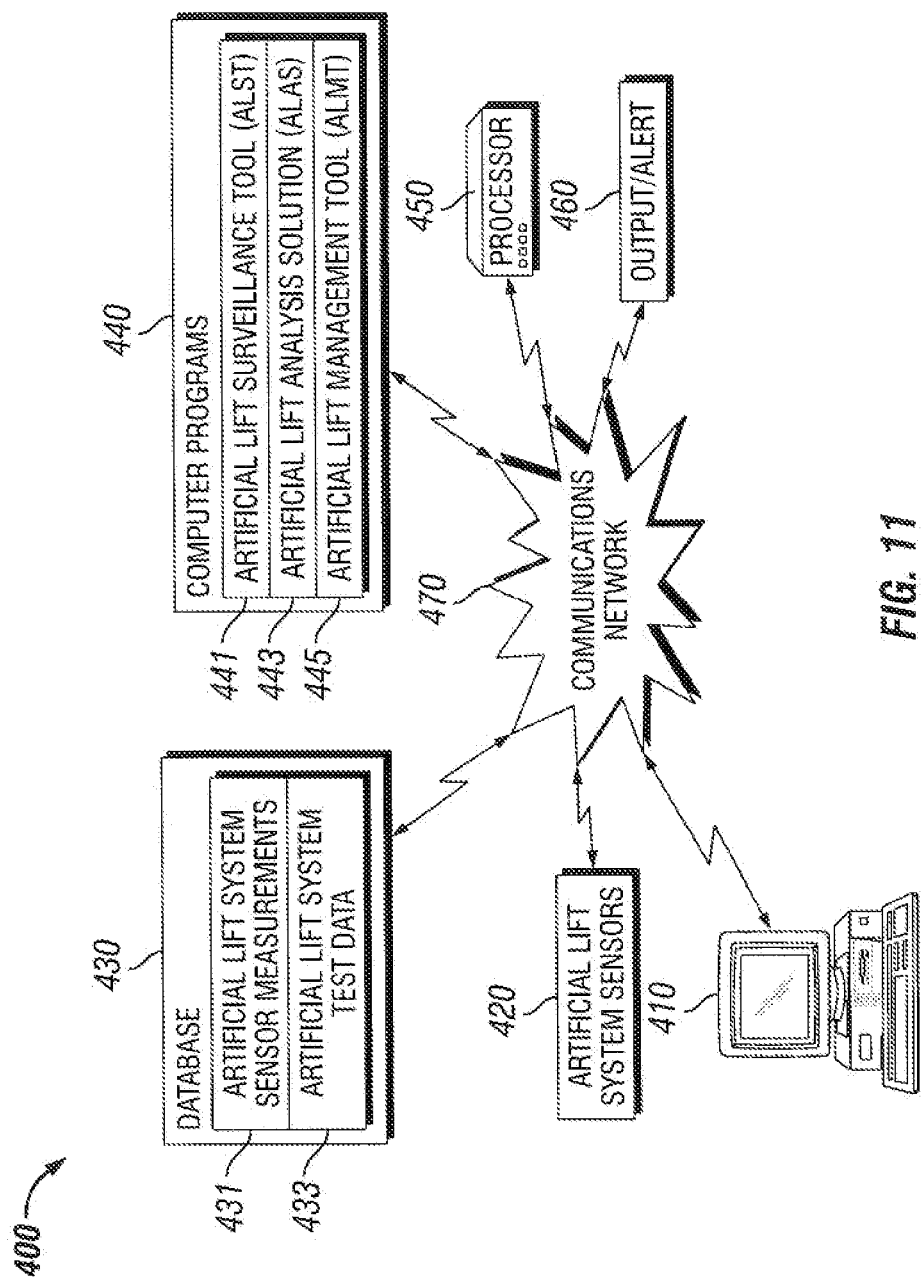
FIG. 11 shows a system for surveillance, analysis, and management of artificial lift systems, according to embodiments of the present invention.

FIG. 11 illustrates an example computer system 400 for surveillance, analysis, and management of artificial lift systems, such as by using the methods and tools previously described herein. System 400 includes user interface 410, such that an operator can actively input information and review operations of system 400. User interface 410 can be any means in which a person is capable of interacting with system 400 such as a keyboard, mouse, or touch-screen display. In some embodiments, user interface 410 embodies spatial computing technologies, which typically rely on multiple core processors, parallel programming, and cloud services to produce a virtual world in which hand gestures and voice commands are used to manage system inputs and outputs.

Operator-entered data input into system 400 through user interface 410, can be stored in database 430. Measured artificial lift system data, such as from POCs, which is received by one or more artificial lilt system sensors 420, can also be input into system 400 for storage in database 430. Additionally, any information generated by system 400 can also be stored in database 430. Accordingly, database 430 can store user-defined parameters, measured parameters, as well as, system generated computed solutions. Database 430 can store, for example, artificial lift systems sensor measurements 431, which are indicative of operational statuses of artificial lift systems, obtained through load cells, motor sensors, pressure transducers and relays. Data recorded by artificial lift system sensors 420 can include, for example, surface card area, peak surface load, minimum surface load, strokes per minute, surface stroke length, flow line pressure, pump fillage, yesterday cycles, and daily run time. Furthermore, gearbox torque, polished rod horse power, and net pump efficiency can be calculated for storage in database 430. Artificial lift system test data 433, which can include last approved oil, last approved water, and fluid level, can also be stored in database 430.

System 400 includes software or computer program 440 that is stored on a non-transitory computer usable or processor readable medium. Current examples of such non-transitory processor readable medium include, but are not limited to, read-only memory (ROM) devices, random access memory (RAM) devices and semiconductor-based memory devices. This includes flash memory devices, programmable ROM (PROM) devices, erasable programmable ROM (EPROM) devices, electrically erasable programmable ROM (EEPROM) devices, dynamic RAM (DRAM) devices, static RAM (SRAM) devices, magnetic storage devices (e.g., floppy disks, hard disks), optical disks (e.g., compact disks (CD-ROMs)), and integrated circuits. Non-transitory medium can be transportable such that the one or more computer programs (i.e., a plurality of instructions) stored thereon can be loaded onto a computer resource such that when executed on the one or more computers or processors, performs the aforementioned functions of the various embodiments of the present invention.

Computer program 440 is used to perform any of the steps or methods described herein. In some embodiments, computer program 440 is in communication (such as over communications network 470) with other devices configured to perform the steps or methods described herein. Examples of computer program 440 include, but are not limited to, Artificial Lift Surveillance Tool (ALST) 441, Artificial Lift Analysis Solution (ALAS) 443, and Artificial Lift Management Tool (ALMT) 445.

Processor 450 interprets instructions or program code encoded on the non-transitory medium to execute computer program 440, as well as, generates automatic instructions to execute computer program 440 for system 400 responsive to predetermined conditions. Instructions from both user interface 410 and computer program 440 are processed by processor 450 for operation of system 400. In some embodiments, a plurality of processors 450 is utilized such that system operations can be executed more rapidly.

In certain embodiments, system 400 includes reporting unit 460 to provide information to the operator or to other systems (not shown). For example, reporting unit 460 can provide alerts to an operator or technician that an artificial lift system is predicted or detected to fail. The alert can be utilized to minimize downtime of the artificial lift system or for other reservoir management decisions. Reporting unit 460 can be a printer, display screen, graphical user interface (GUI), or a data storage device. However, it should be understood that system 400 need not include reporting unit 460, and alternatively user interface 410 can be utilized for reporting information of system 400 to the operator or another designated person.

Communication between any components of system 400, such as user interface 410, artificial lift system sensors 420, database 430, computer program 440, processor 450 and reporting unit 460, can be transferred over communications network 470. Computer system 400 can be linked or connected to other, remote computer systems or measurement devices (e.g., POCs) via communications network 470. Communications network 470 can be any means that allows for information transfer to facilitate sharing of knowledge and resources, and can utilize any communications protocol such as the Transmission Control Protocol/Internet Protocol (TCP/IP). Examples of communications network 470 include, but are not limited to, personal area networks (PANs), local area networks (LANs), wide area networks (WANs), campus area networks (CANs), and virtual private networks (VPNs). Communications network 470 can also include any hardware technology or equipment used to connect individual devices in the network, such as by wired technologies (e.g., twisted pair cables, co-axial cables, optical cables) or wireless technologies (e.g., radio waves).

Many modifications and variations of this invention can be made without departing from its spirit and scope, as will be apparent to those skilled in the art. The specific examples described herein are offered by way of example only, and the invention is to be limited only by the terms of the appended claims, along with the full scope of equivalents to which such claims are entitled.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

What is claimed is:

1. A method for artificial lift system surveillance, the method comprising:
receiving user input for filtering a plurality of artificial lift systems corresponding to a plurality of production wells, wherein the user input indicates filtering using, an operations supervisor category and manage state category, wherein the operations supervisor category represents a field or an asset, and wherein the manage state category allows saving, updating and deleting of a previously saved group of artificial lift systems;
applying the filtering to the plurality of artificial lift systems corresponding to the plurality of production wells;
receiving production well information for the production wells corresponding to the artificial lift systems that satisfy the filtering; and
displaying the production well information for the production wells corresponding to the artificial lift systems that satisfy the filtering in a hierarchical ordering, wherein the hierarchical ordering comprises a treemap that defines a plurality of cells, wherein each cell corresponds to the one of the artificial lift systems and includes at least one cell parameter that is representative of the production well information of the production well corresponding to the artificial lift system such that the production well information serves as proxy of health of the corresponding artificial lift system.

2. The method of claim 1, wherein:
the at least one cell parameter comprises a cell size parameter that defines a size of each cell; and
the size of each cell is increased as the corresponding production well has a production gain and is decreased as the corresponding production well has a production decline.

3. The method of claim 1, wherein the plurality of cells is sized to provide a proportional representation of a net fluid production for each corresponding production well.

4. The method of claim 1, wherein the at least one cell parameter comprises a cell color parameter that indicates a variation in a fluid production rate for the corresponding production well for a time period.

5. The method of claim 1, further comprising filtering by one or more of production well identification information, production well production information, production well test information, and a relationship between one or more of the plurality of production wells.

6. The method of claim 1, further comprising updating the the treemap based on a change in production well production information, production well test information, or a combination thereof.

7. The method of claim 1, further comprising selecting one or more of the cells being displayed in the hierarchical ordering for tracking, flagging, or a combination thereof.

8. The method of claim 1, wherein the user input further indicates filtering using an equipment type category, a group by category, a size by category, a colors show changes since category, or any combination of thereof.

9. The method of claim 8, wherein the equipment type category comprises a gas lift system option, a hydraulic pumping unit option, an electric submersible pump option, a progressive cavity pump option, a plunger lift system option, a beam/rod pump system option, or any combination thereof.

10. The method of claim 8, wherein the size by category comprises a net oil (90 day) option, a net water (90 day) option, a net gas (90 day) option, a net oil (180 day) option, a net water (180 day) option, a net gas (180 day) option, a gross production (90 days) option, a gross production (180 days) option, or any combination thereof.

11. The method of claim 8, wherein the colors show changes since category comprises a delta oil bbl (90 day) option, a delta water bbl (90 day) option, a delta gas mcf (90 day) option, a delta oil bbl (180 day) option, a delta water bbl (180 day) option, a delta gas mcf (180 day) option, or any combination thereof.

12. A system for artificial lift system surveillance, the system comprising: a computer processor; and a computer program executable on the computer processor, the computer program comprising an Artificial Lift Surveillance Tool that:
receives user input for filtering a plurality of artificial lift systems corresponding to a plurality of production wells, wherein the user input indicates filtering using an operations supervisor category and a manage state category wherein the operations supervisor category represents a field or an asset, and wherein the manage state category allows saving, updating and deleting of a previously saved group of artificial lift systems;
applies the filtering to the plurality of artificial lift systems corresponding to the plurality of production wells;
receives production well information for the production wells corresponding to the artificial lift systems that satisfy the filtering; and
displaying with a display the production well information for the production wells corresponding to the artificial lift systems that satisfy the filtering in a hierarchical ordering, wherein the hierarchical ordering comprises a treemap that defines a plurality of cells, wherein each cell corresponds to the one of the artificial lift systems and includes at least one cell parameter that is representative of the production well information of the production well corresponding to the artificial lift system such that the production well information serves as proxy of health of the corresponding artificial lift system.

13. The system of claim 12, wherein:
the at least one cell parameter comprises a cell size parameter that defines a size of each cell; and
each of the plurality of cells is sized to provide a proportional representation of a fluid production rate for the corresponding production well such that the size of each cell is increased proportionally as the corresponding production well has a gain in the fluid production rate and is decreased proportionally as the corresponding production well has a decline in the fluid production rate.

14. The system of claim 12, wherein the at least one cell parameter comprises a cell color parameter that indicates a variation in a fluid production rate for the corresponding production well for a time period.

15. The system of claim 12, wherein the Artificial Lift Surveillance Tool further filters by one or more of production well identification information, production well production information, production well test information, and a relationship between one or more of the plurality of production wells.

16. The system of claim 12, wherein the user input further indicates filtering using an equipment type category, a group by category, a size by category, a colors show changes since category, or any combination of thereof.

17. The system of claim 16, wherein the equipment type category comprises a gas lift system option, a hydraulic pumping unit option, an electric submersible pump option, a progressive cavity pump option, a plunger lift system option, a beam/rod pump system option, or any combination thereof.

18. The system of claim 16, wherein the size by category comprises a net oil (90 day) option, a net water (90 day) option, a net gas (90 day) option, a net oil (180 day) option, a net water (180 day) option, a net gas (180 day) option, a gross production (90 days) option, a gross production (180 days) option, or any combination thereof.

19. The system of claim 16, wherein the colors show changes since category comprises a delta oil bbl (90 day) option, a delta water bbl (90 day) option, a delta gas mcf (90 day) option, a delta oil bbl (180 day) option, a delta water bbl (180 day) option, a delta gas mcf (180 day) option, or any combination thereof.

20. The system of claim 12, wherein the Artificial Lift Surveillance Tool further selects one or more of the cells being displayed in the hierarchical ordering for tracking, flagging, or a combination thereof.

21. A non-transitory computer readable medium containing computer readable software instructions, that upon execution, are used for surveillance of artificial lift systems, the computer readable instructions comprising:
receiving user input for filtering a plurality of artificial lift systems corresponding to a plurality of production wells, wherein the user input indicates filtering using an operations supervisor category and a manage state category wherein the operations supervisor category represents a field or an asset, and wherein the manage state category allows saving, updating, and deleting of a previously saved group of artificial lift systems;
applying the filtering to the plurality of artificial lift systems corresponding to the plurality of production wells;
receiving production well information for the production wells corresponding to the artificial lift systems that satisfy the filtering; and
displaying with a display the production well information for the productions wells corresponding to the artificial lift systems that satisfy the filtering in a hierarchical ordering, wherein the hierarchical ordering comprises a treemap that defines a plurality of cells, wherein each cell corresponds to one of the artificial lift systems and includes at least one cell parameter that is representative of the production well information of the production well corresponding to the artificial lift system such that the production well information serves as a proxy of health for the corresponding artificial lift system.

* * * * *